United States Patent
Ando

(10) Patent No.: US 10,514,458 B2
(45) Date of Patent: Dec. 24, 2019

(54) DETECTION SYSTEM, DETECTION DEVICE, AND DETECTION METHOD

(71) Applicant: OMRON Corporation, Kyoto-shi, Kyoto (JP)

(72) Inventor: Shintaro Ando, Ayabe (JP)

(73) Assignee: OMRON Corporation, Kyoto-shi (JP)

( * ) Notice: Subject to any disclaimer, the term of this patent is extended or adjusted under 35 U.S.C. 154(b) by 181 days.

(21) Appl. No.: 15/786,641

(22) Filed: Oct. 18, 2017

(65) Prior Publication Data

US 2018/0217259 A1    Aug. 2, 2018

(30) Foreign Application Priority Data

Jan. 30, 2017   (JP) .................................. 2017-014533

(51) Int. Cl.
| | | |
|---|---|---|
| *G01S 17/02* | (2006.01) | |
| *G01S 7/51* | (2006.01) | |
| *G01S 17/08* | (2006.01) | |

(52) U.S. Cl.
CPC .............. *G01S 17/026* (2013.01); *G01S 7/51* (2013.01); *G01S 17/08* (2013.01)

(58) Field of Classification Search
CPC ........ G01S 17/026; G01S 17/02; G01S 17/48; G01S 17/936; G01S 17/107
See application file for complete search history.

(56) References Cited

U.S. PATENT DOCUMENTS

| | | | |
|---|---|---|---|
| 2010/0245164 A1* | 9/2010 | Kauffman | ................. G01S 7/22 342/26 B |
| 2018/0045818 A1* | 2/2018 | Majumdar | ............ G01S 7/4817 |

FOREIGN PATENT DOCUMENTS

JP           H8-14889 A       1/1996

* cited by examiner

*Primary Examiner* — Thanh Luu
(74) *Attorney, Agent, or Firm* — Metrolex IP Law Group, PLLC

(57) ABSTRACT

A detection system includes a detection device and a display device. The detection device includes a light projecting unit that projects light to a detection object, a light receiving unit that receives reflection light of the light, a light reception quantity acquiring unit that acquires a light reception quantity, and a distance acquiring unit that acquires a distance between a position at which the light is reflected and the detection object. The control device includes a setting unit that sets a threshold value range which is a combination of a threshold value of the light reception quantity and a threshold value of the distance, a detector that detects the detection object based on whether the light reception quantity and the distance belong to the threshold value range, and a display unit that displays correspondence information in which the light reception quantity and the distance are related to each other.

20 Claims, 17 Drawing Sheets

DETECTION SYSTEM, DETECTION DEVICE, AND DETECTION METHOD

CROSS-REFERENCE TO RELATED APPLICATION

This application is based on Japanese Patent Application No. 2017-014533 filed with the Japan Patent Office on Jan. 30, 2017, the entire contents of which are incorporated herein by reference.

FIELD

The present technique relates to a detection system, a detection device, and a detection method for detecting a detection object.

BACKGROUND

There have been conventionally proposed detection devices that detect a detection object. For example, a detection device disclosed in JP H8-014889 A acquires a light reception quantity of reflection light of light projected by the detection device, and a distance between the detection device and the detection object. It is proposed that the detection device sets one of a first mode of detecting a detection object by using the light reception quantity and by not using the distance, and a second mode of detecting a detection object by using the distance and by not using the light reception quantity.

As described above, the detection device described in JP H8-014889 A detects a detection object by using one of the light reception quantity and the distance and by not using the other of the light reception quantity and the distance, when any one of the first mode and the second mode is selected. Therefore, in the situation where a detection object cannot be detected when only the light reception quantity is used, or in the situation where a detection object cannot be detected when only the distance is used, there has been a problem that a detection object cannot be properly detected.

SUMMARY

In order to solve the above problem, the present technique provides a detection system, a detection device, and a detection method that are capable of properly detecting a detection object, even in the situation where a detection object cannot be detected when only a light reception quantity is used, or in the situation where a detection object cannot be detected when only a distance is used.

A detection system according to one aspect includes a detection device, and a control device that controls the detection device. The detection system includes: a light projecting unit that projects light to a detection object; a light receiving unit that receives reflection light of the light; a light reception quantity acquiring unit that acquires a light reception quantity received by the light receiving unit; a distance acquiring unit that acquires a distance between a position at which the light is reflected and the detection object; a setting unit that sets a threshold value range which is a combination of a threshold value of the light reception quantity and a threshold value of the distance; a detector that detects the detection object, based on whether the light reception quantity and the distance belong to the threshold value range; and a display unit that displays correspondence information in which the light reception quantity acquired by the light reception quantity acquiring unit and the distance acquired by the distance acquiring unit are related to each other.

It may be preferable that the correspondence information is information in which the light reception quantity and the distance are shown two-dimensionally.

It may be preferable that the detection system can receive input information from a user, when the correspondence information is displayed in the display unit, and the setting unit sets the threshold value range, based on the input information that the user inputs in response to the correspondence information displayed in the display unit.

It may be preferable that the display unit is provided with an input unit on a display surface, and, when the user touches the display surface, the display unit is able to receive information at a user-touched position on the display surface, as the input information. The setting unit sets the threshold value range, based on the information at the user-touched position on the display surface of the display unit in which the correspondence information is displayed.

It may be preferable that the setting unit sets the threshold value range in a range different from the user-touched position on the display surface in which the correspondence information is displayed.

It may be preferable that, when the user touches the display surface so as to form a closed region on the display surface in which the correspondence information is displayed, the setting unit sets the threshold value range based on the closed region.

It may be preferable that, when the user touches the display surface in two lines on the display surface in which the correspondence information is displayed, the setting unit sets the threshold value range based on a range sandwiched by the two lines.

It may be preferable that at least one of the two lines is a straight line.

It may be preferable that at least one of the two lines is a curve line.

It may be preferable that, when the user touches a plurality of regions on the display surface in which the correspondence information is displayed, the setting unit sets the plurality of threshold value ranges based on the plurality of regions.

A detection device according to another aspect includes: a light projecting unit that projects light to a detection object; a light receiving unit that receives reflection light of the light; a light reception quantity acquiring unit that acquires a light reception quantity received by the light receiving unit; a distance acquiring unit that acquires a distance between a position at which the light is reflected and the detection object; a setting unit that sets a threshold value range which is a combination of a threshold value of the light reception quantity and a threshold value of the distance; and a detector that detects the detection object, based on whether the light reception quantity and the distance belong to the threshold value range.

A detection method according to another aspect is for detecting a detection object, based on: a step of acquiring a light reception quantity of a light receiving unit that receives reflection light of light projected to a detection object; a step of acquiring a distance between a position at which the light is reflected and the detection object; and whether the light reception quantity and the distance belong to a threshold value range which is a combination of a threshold value of the light reception quantity and a threshold value of the distance.

According to the detection system, the detection device, and the detection method of the present technique, it is possible to properly detect a detection object, even in the situation where a detection object cannot be detected when only a light reception quantity is used, or in the situation where a detection object cannot be detected when only a distance is used.

DETAILED DESCRIPTION

Figure 1:
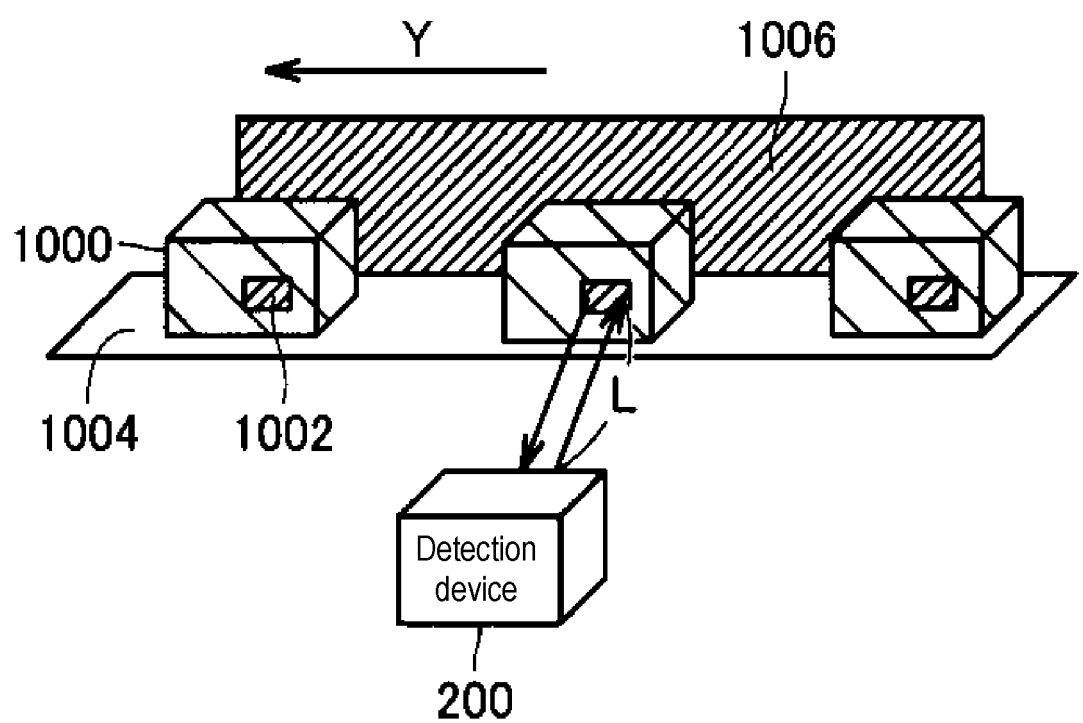
FIG. 1 is a diagram for explaining an example of a situation where a detection system according to an embodiment is applied.

Embodiments will be described in detail with reference to the drawings. In the drawings, identical or equivalent portions will be attached with reference symbols and description of these portions will not be repeated.

Situation where a Detection Device 200 is Used

First, an example of a situation where a detection device 200 is used will be described. FIG. 1 is a diagram for explaining the example of the situation where the detection device 200 is used. In the example shown in FIG. 1, a plurality of works 1000 are mounted on a belt conveyor 1004. The belt conveyor 1004 can move in a Y-axis direction. A mark 1002 is attached to each work 1000. The detection device 200 is disposed to face each work 1000. It is assumed that a rear wall 1006 (a background) viewed from the detection device 200 and each mark 1002 have the same color. A detection system 1 (see FIG. 2) according to an embodiment detects each mark 1002 as a detection object. The detection system 1 performs a predetermined control based on the detected mark 1002. The predetermined control includes, for example, a control of blowing an ink to the detected mark 1002.

Example of Detection System According to Embodiment

Figure 2:
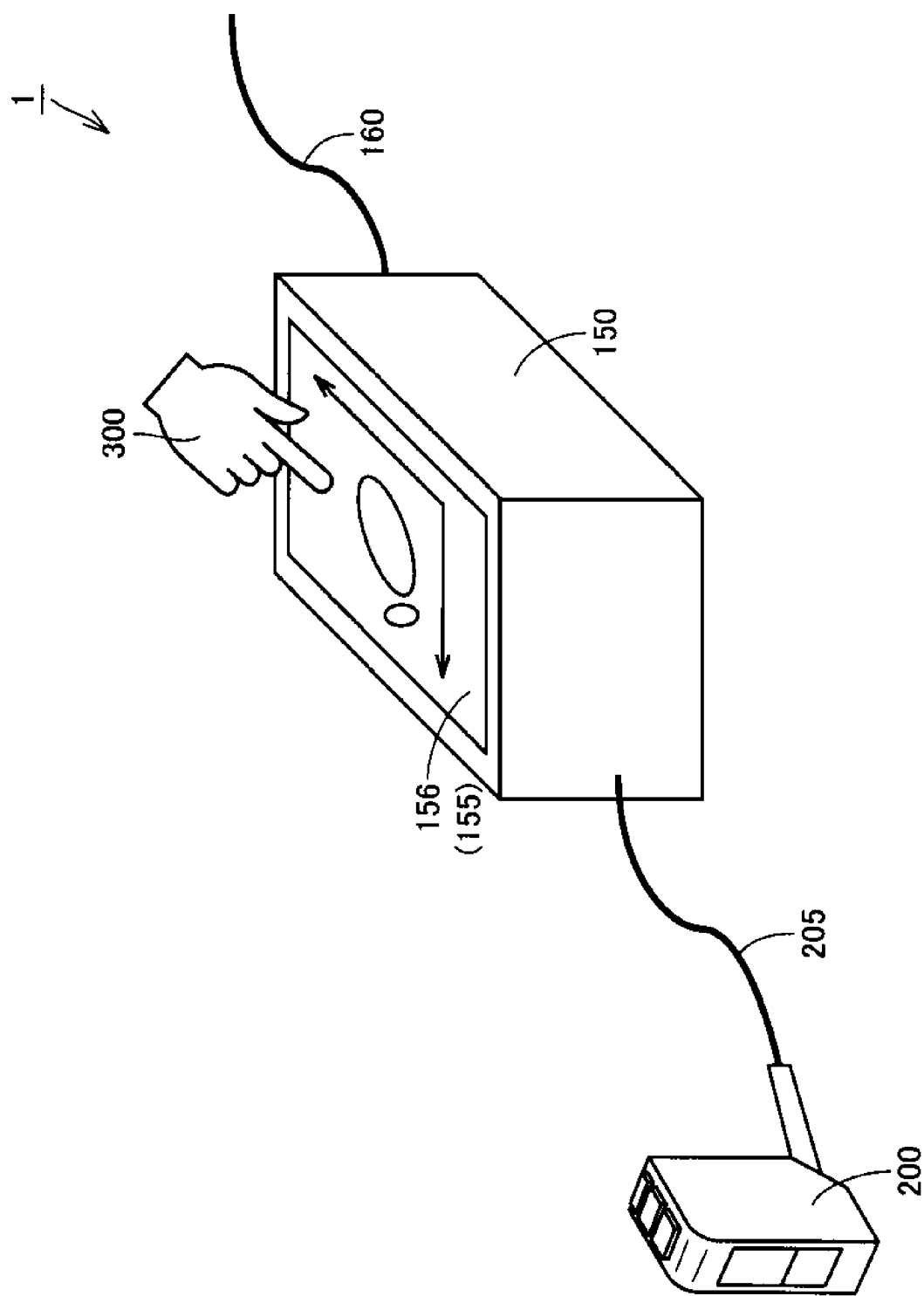
FIG. 2 is a diagram for explaining a configuration example of the detection system according to an embodiment.

FIG. 2 is a diagram for explaining an example of the detection system 1 according to an embodiment. The detection system 1 according to an embodiment includes the detection device 200 and a display device 150. The detection device 200 is a photoelectric sensor, for example. The display device 150 is also referred to as a control device, for controlling the detection device 200. The detection device 200 is connected to the display device 150 with a cable 205. The display device 150 is also connected to a power source with a cable 160. The display device 150 also outputs an ON signal and an OFF signal described later, via the cable 160.

The display device 150 has a display unit 155. Also, the display unit 155 is configured by a touch panel. A system of the touch panel may be any system. For the system of the touch panel, there may be employed any one of a resistance film system, a surface acoustic wave system, an infrared system, and an electromagnetic induction system, for example. The display unit 155 can receive input information from a user, when the display unit 155 is displaying two-dimensional information described later. The display unit 155 has a display surface 156 that is touched by the user.

In an embodiment, prior to a detection step in which the detection system 1 detects a detection object, the user can set a threshold value range to the display device 150 according to an embodiment. In the detection step, the detection system 1 detects a detection object, based on the set threshold value range. The user can set the threshold value range, by touching the display surface 156. In the detection system 1, at the same time when a light reception quantity acquiring unit 204 (see FIG. 3) acquires a light reception quantity, a distance acquiring unit 206 (see FIG. 3) acquires a distance between the detection device 200 and a position at which light projected by the detection device 200 is reflected.

When a light reception quantity that the light reception quantity acquiring unit 204 is acquiring belongs to the threshold value range and also when a distance that the distance acquiring unit 206 is acquiring belongs to the threshold value range, the detection system 1 decides that the detection system is detecting the mark 1002. On the other hand, in other cases, the detection system 1 decides that the detection system is not detecting the mark 1002. The other cases include a case where a light reception quantity that the light reception quantity acquiring unit 204 of the detection device 200 is acquiring belongs to the threshold value range, but a distance that the distance acquiring unit 206 of the detection device 200 is acquiring does not belong to the threshold value range. The other cases also include a case where a light reception quantity that the light reception quantity acquiring unit 204 of the detection device 200 is acquiring does not belong to the threshold value range, but a distance that the distance acquiring unit 206 of the detection device 200 is acquiring belongs to the threshold value range. The other cases also include a case where a light reception quantity that the light reception quantity acquiring unit 204 of the detection device 200 is acquiring does not belong to the threshold value range, and a distance that the distance acquiring unit 206 of the detection device 200 is acquiring does not belong to the threshold value range. As described above, the detection system 1 detects the mark 1002 which is a detection object, based on the threshold value range which is set by the user.

Figure 3:
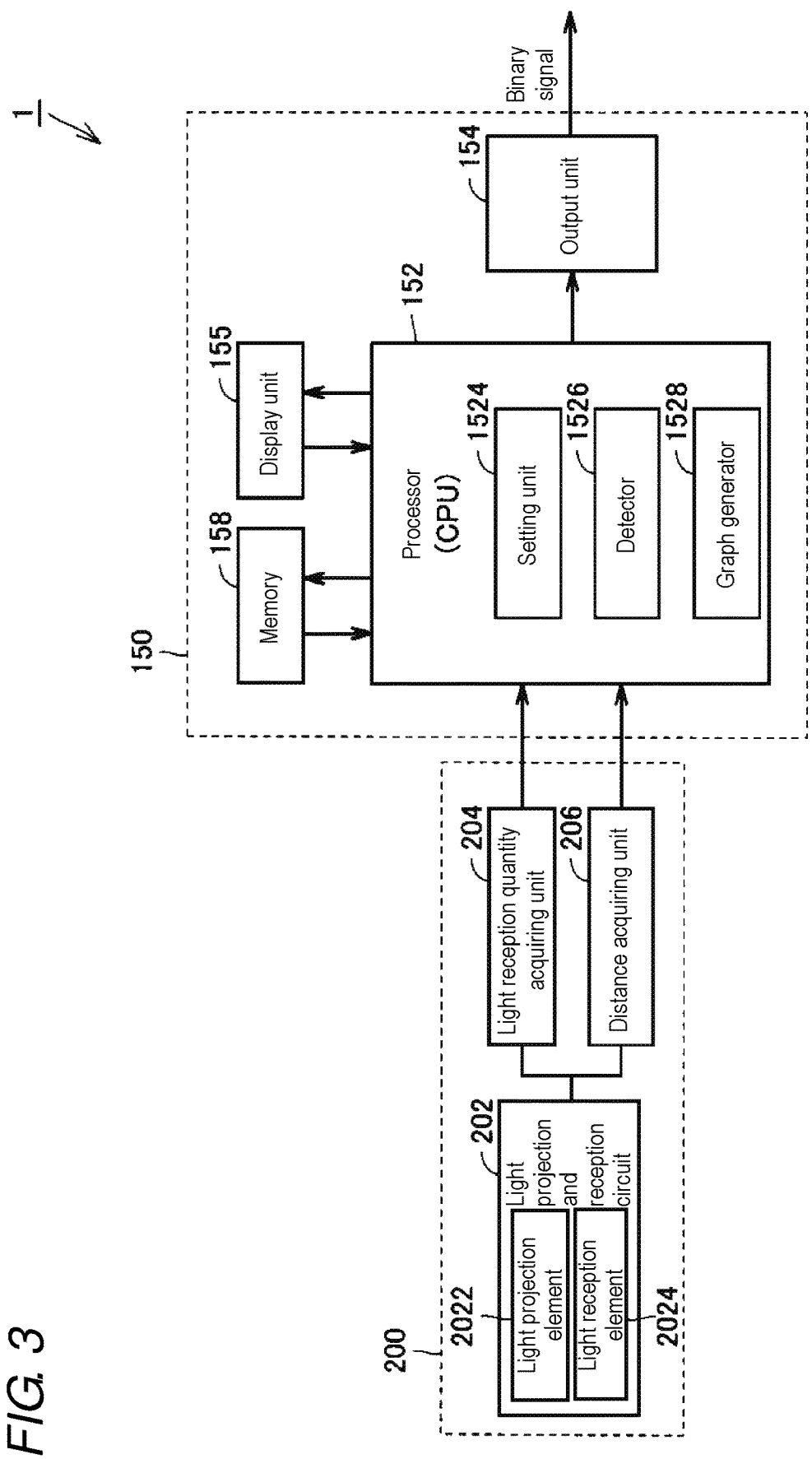
FIG. 3 is a diagram for explaining a functional configuration example of the detection system according to an embodiment.

FIG. 3 is a diagram for explaining a functional configuration example of the detection system 1. A functional configuration example of the detection device 200 and a functional configuration example of the display device 150 will be described with reference to FIG. 3. As shown in FIG. 3, the detection device 200 includes a light projection and reception circuit 202, the light reception quantity acquiring unit 204, and the distance acquiring unit 206. The light projection and reception circuit 202 includes a light projection element 2022, and a light reception element 2024. The light projection element 2022 is also referred to as a light projecting unit. The light reception element 2024 is also referred to as a light receiving unit.

The display device 150 includes a processor 152, an output unit 154, a display surface 156, and a memory 158. The processor 152 functions as a central processing unit (CPU) of the display device 150. The processor 152 has a function of a setting unit 1524, a function of a detector 1526, and a function of a graph generator 1528. The memory 158 can store various kinds of information such as a threshold value range. The memory 158 includes a read only memory (ROM) and a random access memory (RAM).

The light projection element 2022 outputs light. The light may be visible light or infrared light, for example. The light reception element 2024 receives reflection light of the light output by the light projection element 2022. The light reception quantity acquiring unit 204 acquires a quantity of the light (hereinafter, light reception quantity) received by the light reception element 2024. The distance acquiring unit 206 acquires a distance L between the detection device 200 (the light reception element 2024) and a position from which the light from the light projection element 2022 is reflected. A method of acquiring the distance L may be any method, and a triangulation method may be used. When the light projected from the light projection element 2022 is reflected by the work 1000, the distance acquiring unit 206 acquires a distance between the detection device 200 and the work 1000. The distance acquiring unit 206 may acquire a distance based on a light reception quantity of the light received by the light reception element 2024, or may acquire a distance not based on the light reception quantity.

The data of the light reception quantity (hereinafter, referred to as light reception quantity data) acquired by the light reception quantity acquiring unit 204, and the data of the distance L (hereinafter, referred to as distance data) acquired by the distance acquiring unit 206 are input to the processor 152. The graph generator 1528 displays two-dimensional information, which two-dimensionally shows the light reception quantity acquired by the light reception quantity acquiring unit 204 and the distance L acquired by the distance acquiring unit 206, based on the input light reception quantity data and the input distance data. The two-dimensional information is also referred to as a graph.

The light reception quantity acquiring unit 204 according to an embodiment has a larger light reception quantity along with a higher degree of similarity between the color of the reflected position and the color of the mark 1002. The light reception quantity is set to have a maximum value when the color of the reflected position is the same as the color of the mark 1002. In the example in FIG. 1, because the color of the wall 1006 is the same as the color of the mark 1002, when the light is reflected by the mark 1002, or when the light is reflected by the wall 1006, the light reception quantity has a maximum value.

In the state that the detection device 200 is detecting the mark 1002, the output unit 154 externally outputs, via the cable 160, an ON signal which indicates that the detection device is detecting the mark 1002. In the state that the detection device 200 is not detecting the mark 1002, the output unit 154 externally outputs, via the cable 160, an OFF signal which indicates that the detection device 200 is not detecting the mark 1002. External device (not shown) performs a predetermined control based on an ON signal or OFF signal which are externally output.

About Two-dimensional Information

Figure 4:
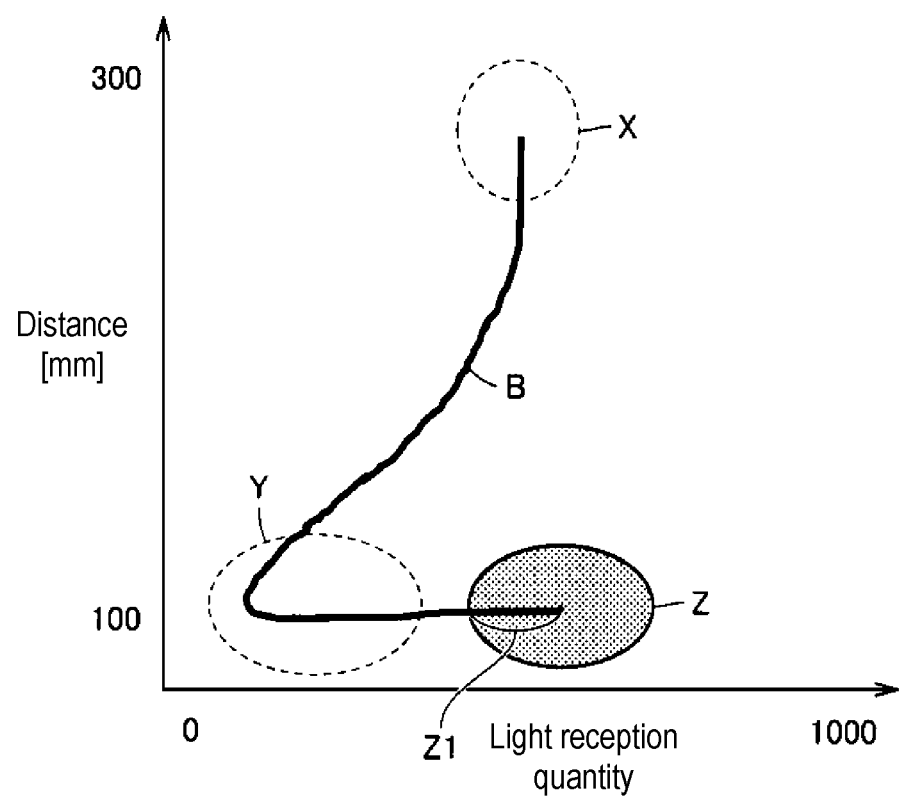
FIG. 4 is a diagram for explaining two-dimensional information according to an embodiment.

FIG. 4 is a diagram for explaining an example of the two-dimensional information displayed on the display surface 156. The two-dimensional information according to an embodiment will be described with reference to FIG. 4. The example in FIG. 4 shows the light reception quantity acquired by the light reception quantity acquiring unit 204, in the X-axis, and shows the distance L acquired by the distance acquiring unit 206, in the Y-axis. The example in FIG. 4 displays a graph B which is based on the light reception quantity and the distance. As a modification, the X-axis may show the distance L, and the Y-axis may show the light reception quantity.

In the situation as shown FIG. 1, a state that the detection device 200 is detecting the mark 1002 is a state that the distance L acquired by the distance acquiring unit 206 is relatively short and also the light reception quantity acquired by the light reception quantity acquiring unit 204 is relatively large. Under this situation, the user can assume that the mark 1002 is being detected in the range of about Z1. Then, the user assigns (touches) a region Z which includes the range Z1, with a finger or with a stylus pen. As a result, the setting unit 1524 sets the range Z1 as a threshold value range. The data of the threshold value range set with the setting unit 1524 is stored in the memory 158. The data of the threshold value range is configured by, for example, minimum value data of the distance, maximum value data of the distance, minimum value data of the light reception quantity, and maximum value data of the light reception quantity.

In FIG. 1, a state that the distance and the light reception quantity that belong to the region X in FIG. 4 are acquired can be said as the state that the detection device 200 is detecting the wall 1006 (that is, the wall 1006 is reflecting the light projected from the detection device 200). This is because the light reception quantity that belongs to the region X is approximately the same as the light reception quantity of the range Z1, and on the other hand, the distance that belongs to the region X is longer than the distance of the range Z1.

In FIG. 1, a state that the distance and the light reception quantity that belong to the region Y in FIG. 4 are acquired can be said as the state that the detection device 200 is detecting a position other than the mark 1002 out of the work 1000 (that is, the light projected from the detection device 200 is reflected at a position other than the mark 1002 out of the work 1000). This is because the distance that belongs to the region Y is approximately the same as the distance shown in the range Z1, and on the other hand, the light reception quantity that belongs to the region Y is smaller than the light reception quantity of the range Z1.

The graph B is generated and displayed based on the light reception quantity and the distance acquired by the detection device 200 that detects one of the works carried by the belt conveyor. However, the graph B is not generated and displayed based on the light reception quantity and the distance acquired by detection at one time, but is generated and displayed based on the light reception quantity and the distance acquired by detection at a plurality of times. Therefore, when a detected value has a large variance, a line width of the graph B becomes large, and when a detected value has a small variance, a line width of the graph B becomes small.

A processing step of the detection system 1 of an embodiment includes a two-dimensional information display step, a threshold value range setting step, and a detection step. The two-dimensional information display step is a step of displaying two-dimensional information (graph) of each of a plurality of works, by accumulating (collectively) the two-dimensional information of each of the plurality of works, by moving the plurality of works, as shown in FIG. 1. The threshold value range setting step is a step in which the user sets a threshold value range to the displayed two-dimensional range. The set threshold value range is stored in the memory 158. An input unit is provided on the display surface 156. When the user touches the display surface 156, the input unit can receive the information about the touched position as input information. The input information received from the display surface 156 (the display unit 155) is transmitted to the processor 152. The threshold value range setting step is a step of setting the threshold value range, on the display surface 156 on which the two-dimensional information is displayed, based on the information about the user-touched position (input information). The detection step is a step in which the detection system 1 detects a detection object (the mark 1002), based on the set threshold value range. Further, in the detection step, the threshold value range that is stored in the memory 158 is read, and the detection system 1 detects the detection object (the mark 1002), based on the read threshold value range. In the detection step, the detection object may be identical with the detection object that is detected in the two-dimensional information display step, or may be the detection object different from the detection object that is detected in the two-dimensional information display step. Hereinafter, these three steps will be described in detail.

About Two-dimensional Information Display Step

First, the two-dimensional information display step will be described. In the two-dimensional information display step according to an embodiment, a plurality of works 1000 are mounted on the belt conveyor 1004, and are moved in the Y-axis direction. In an embodiment, it is assumed that the plurality of works 1000 are identical with each other. The detection system 1 acquires the distance data and the light reception quantity data of each of the plurality of identical works 1000. In the two-dimensional information display step, two-dimensional information is acquired and is also displayed.

Figure 5:
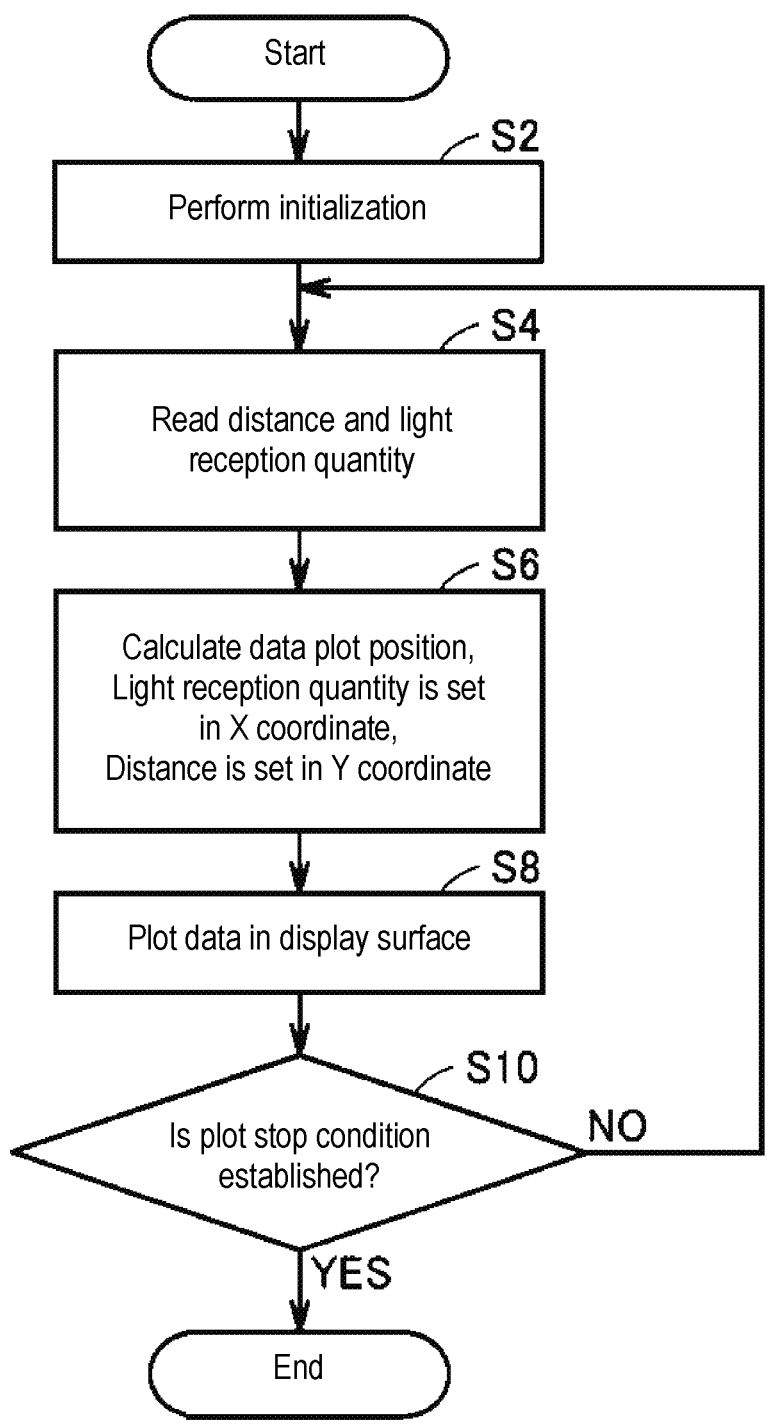
FIG. 5 is a diagram for explaining an example of a flowchart of two-dimensional information display step according to an embodiment.

FIG. 5 is a flowchart of the two-dimensional information display step. In S2, the processor 152 performs initialization. The initialization includes, for example, a preparation process for the detection device 200 to detect a detection object. Further, the initialization includes, not only the process of the detection system 1, but also the process for moving the belt conveyor 1004 as an external device.

Next, in S4, the graph generator 1528 reads the light reception quantity acquired by the light reception quantity acquiring unit 204 and the distance acquired by the distance acquiring unit 206.

Figure 6:
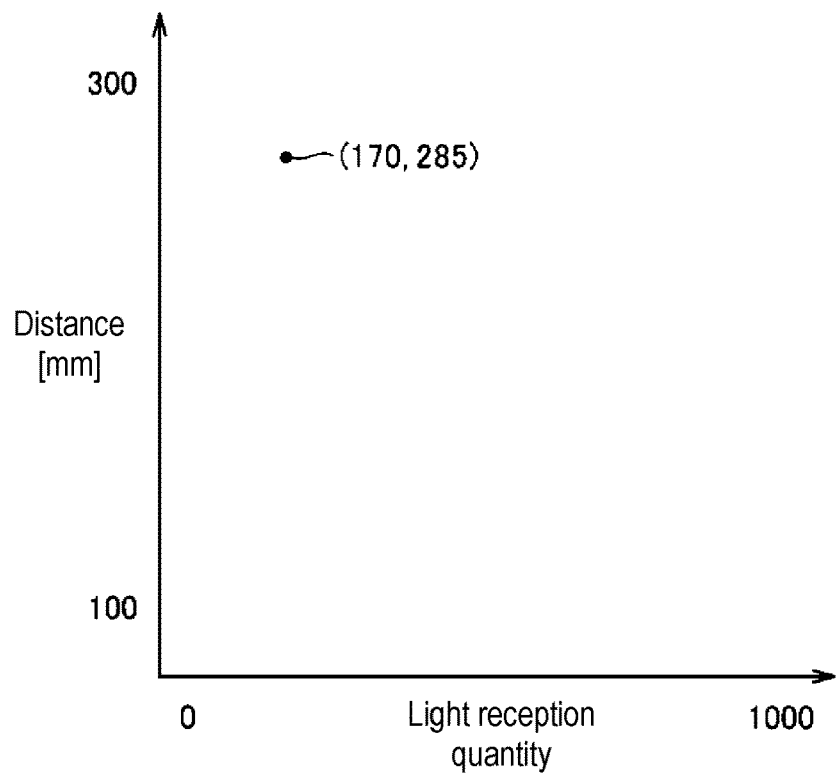
FIG. 6 is a diagram for explaining a plot according to an embodiment.

Next, in S6, the graph generator 1528 calculates a data plot position. In an embodiment, as shown in FIG. 4, the light reception quantity is set in the X coordinate, and the distance is set in the Y coordinate. Next, in S8, the graph generator 1528 plots the data set in S6, on the display surface 156. FIG. 6 is a diagram showing an example of a point plotted in S8. FIG. 6 shows an example of a case where the point corresponding to the light reception quantity of 170 and corresponding to the distance of 285 is plotted. The unit of the distance is "mm", for example. The light reception quantity is a value that a light reception element 2024 can receive, with a maximum value set at a predetermined value (1000, for example).

In S10, the graph generator 1528 decides whether a plot stop condition is established. The plot stop condition includes a user stop condition and a work end condition. The user stop condition is a condition which is established when the user performs an operation of ending the two-dimensional information display step. The work end condition is a condition which is established when the reading of the distance data and the light-reception quantity data of all the plurality of works ends. In S10, when it is decided that the plot stop condition is established (YES in S10), the two-dimensional information display step ends. In S10, when it is decided that the plot stop condition is not established (NO in S10), the process returns to S4.

One process configured by S4 to S10 is performed for each sampling cycle. The sampling cycle is a cycle which is set in advance, and is 0.1 second, for example. The sampling cycle may be arranged to be able to be set by the user.

By repeating the one process configured by S4 to S10, two-dimensional information as an aggregate of the points (the graph B shown in FIG. 4) is generated.

About Threshold Value Range Setting Step

The threshold value range setting step will be described next. In the threshold value range setting step according to an embodiment, when the user touches the display surface 156 on which the two-dimensional information is displayed, a threshold value range is set. In the threshold value range setting step according to an embodiment, the user can touch the display surface 156 in various modes. The various modes will be described below with reference to FIG. 7 to FIG. 11.

Figure 7:
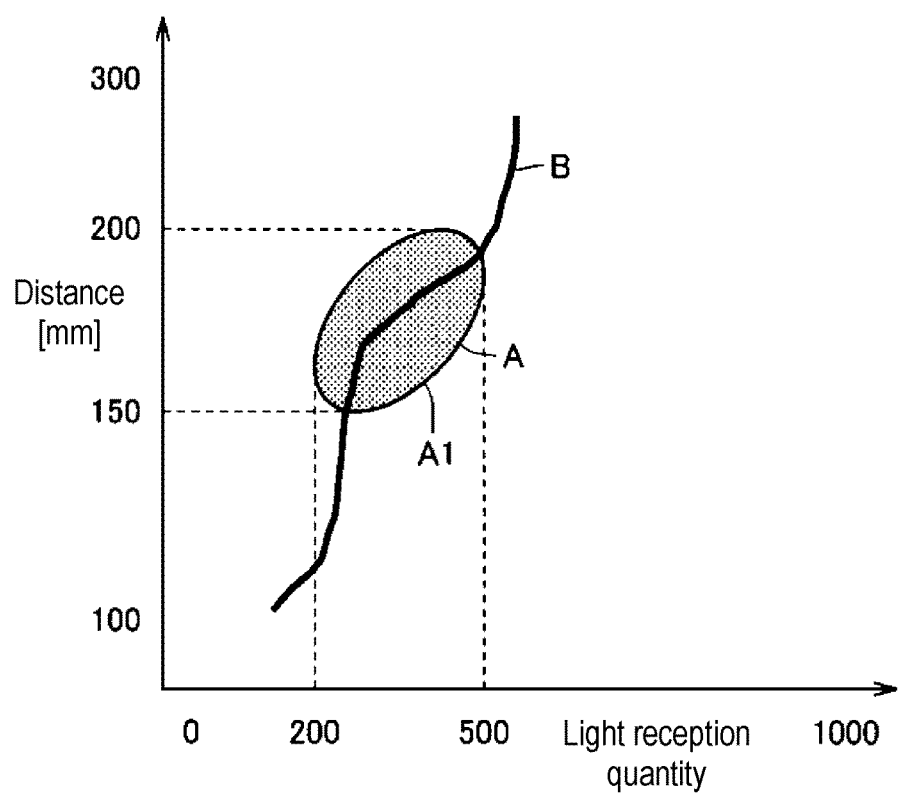
FIG. 7 is a diagram for explaining an example of a threshold value range according to an embodiment.

FIG. 7 shows an example of a case where the user touches the display surface 156 to form a closed region (to surround a circle or an oblong). In the example in FIG. 7, a case where the user touches the display surface 156 to form a closed region is, for example, a case where the user touches an outline A1. In this case, the setting unit 1524 sets the closed region formed by the outline A1, as the threshold value range A. The threshold value range A is a range that is dotted in FIG. 7. The threshold value range A in FIG. 7 is a range in which a range of the light reception quantity is 200 to 500, and a range of the distance is included in a rectangular range of 150 to 200. In the detection step described later, when the light reception quantity acquired by the light reception quantity acquiring unit 204 belongs to the threshold value range A and also the distance acquired by the distance acquiring unit 206 belongs to the threshold value range A simultaneously with the acquired light reception quantity, the mark 1002 is being detected. In a state other than this state, the mark 1002 is not being detected.

As described above, the user can set the threshold value range A, by touching the display surface 156 on which the two-dimensional information is displayed, so as to form a closed region. Therefore, the user can easily set the threshold value range A.

Figure 8:
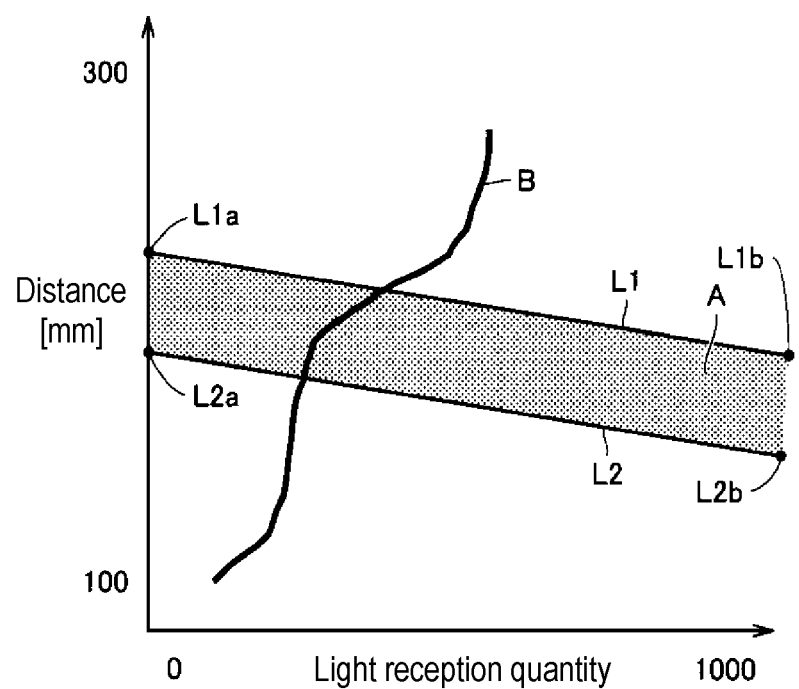
FIG. 8 is a diagram for explaining an example of a threshold value range according to an embodiment.

FIG. 8 shows an example of a case where the user touches the display surface 156 so as to draw two lines. In the example shown in FIG. 8, the two lines are a straight line L1 and a straight line L2. End points of the straight line L1 are L1a and L1b. Further, end points of the straight line L2 are L2a and L2b.

In this case, in the setting unit 1524, it is regarded that a straight line that connects between L1a and an end point close to the L1a out of end points of the straight line L2 different from the straight line L1 including the L1a (that is, L2a) is drawn. Further, in the setting unit 1524, it is regarded that a straight line that connects between L2a and an end point close to the L2a out of end points of the straight line L2 different from the straight line L1 including the L2a (that is, L2b) is drawn. Thereafter, the setting unit 1524 sets, as the threshold value range A, a closed region surrounded by the straight line which connects between L1a and L2a, the straight line which connects between L1b and L2b, the straight line L1, and the straight line L2.

As described above, the user can set the threshold value range A by touching the display surface 156 so as to draw two straight lines on the display surface 156 which displays the two-dimensional information. Therefore, the user can easily set the threshold value range A. Further, the user can set the threshold value range A having a large range of the light reception quantity, by touching the display surface 156 so as to draw two straight lines in the X-axis direction. Further, the user can set the threshold value range A having a large range of the distance, by touching the display surface 156 so as to draw two straight lines in the Y-axis direction.

Figure 9:
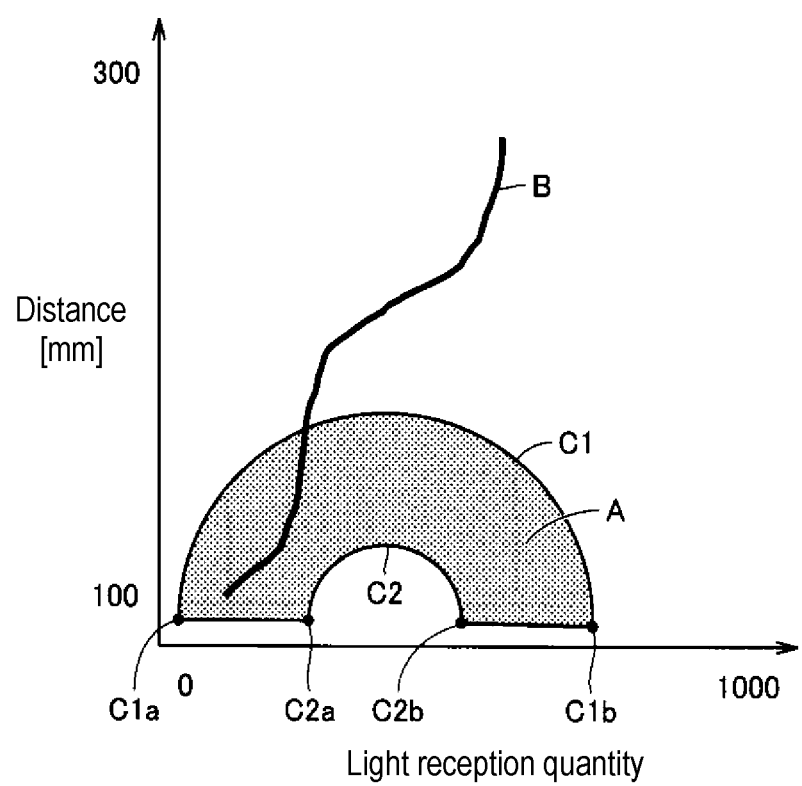
FIG. 9 is a diagram for explaining an example of a threshold value range according to an embodiment.

FIG. 9 shows an example of a case where the user touches the display surface 156 so as to draw two lines. In the example shown in FIG. 9, the two lines are a curve line C1 and a curve line C2. End points of the curve line C1 are C1a and C1b. Further, end points of the curve line C2 are C2a and C2b.

In this case, in the setting unit 1524, it is regarded that a straight line that connects between C1a and an end point close to the C1a out of end points of the curve line C2 different from the curve line C1 including the C1a (that is, C2a) is drawn. Further, in the setting unit 1524, it is regarded that a straight line that connects between C2a and an end point close to the C2a out of end points of the curve line C2 different from the curve line C1 including the C2a (that is, C2b) is drawn. Thereafter, the setting unit 1524 sets, as the threshold value range A, a closed region surrounded by the straight line which connects between C1a and C2a, the straight line which connects between C1b and C2b, the curve line C1, and the curve line C2.

As described above, the user can set the threshold value range A by touching the display surface 156 so as to draw two curve lines on the display surface 156 which displays the two-dimensional information. Therefore, the user can easily set the threshold value range A.

FIG. 8 shows an example of the case where both the two lines drawn by the user are straight lines, and FIG. 9 shows an example of the case where both the two lines drawn by the user are curve lines. Alternatively, out of the two lines, one line may be a straight line and the other line may be a curve line. Regarding the curve lines in FIG. 9, each curve line has one arc. Alternatively, the curve line may have a plurality of arcs (a wavy line, for example).

As described above, even when the user does no touch the display surface 156 to form a closed region, the closed region is regarded to be formed when the user touches the display surface 156 to draw two lines. Therefore, convenience for the user can be improved.

Figure 10:
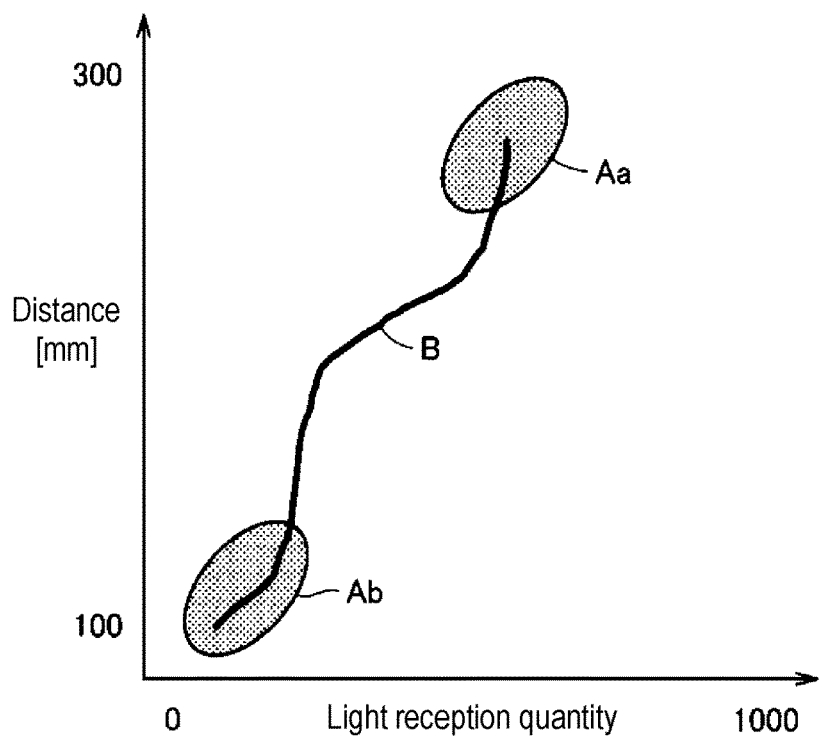
FIG. 10 is a diagram for explaining an example of a threshold value range according to an embodiment.

FIG. 7 shows a case where one threshold value range A is set. Alternatively, it may be arranged such that two or more threshold value ranges A can be set. FIG. 10 shows a case where two threshold value ranges A are set. As shown in FIG. 10, when the user touches the display surface 156 to draw two or more closed regions, the two or more closed regions are set as a threshold value range Aa and a threshold value range Ab of the two or more. As described above, the user can set two or more threshold value ranges.

A user touch mode for setting the two or more threshold value ranges is not limited to a touch mode of forming a closed region (see FIG. 7), but may be touch modes described with reference to FIG. 8 and FIG. 9.

With reference to FIG. 7 and FIG. 10, there have been described examples of a case where the closed region touched by the user is set as the threshold value range A. Alternatively, the setting unit 1524 may set, as the threshold value range A, a region other than the closed region touched by the user. That is, the setting unit 1524 sets a range different from the threshold value range A, based on a position of the display surface 156 touched by the user.

Figure 11:
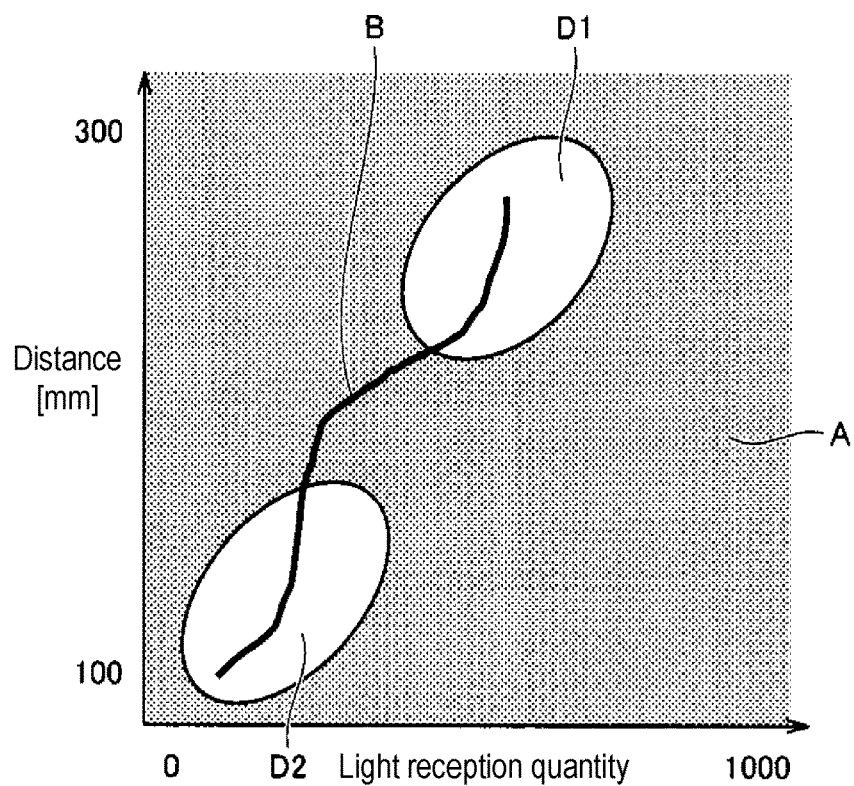
FIG. 11 is a diagram for explaining an example of a threshold value range according to an embodiment.

FIG. 11 shows an example of a case where a region other than a closed region touched by the user is set as the threshold value range A. FIG. 11 is a diagram showing a case where the user touches the display surface 156 so that two closed regions D1 and D2 are formed by the user.

As shown in FIG. 11, the setting unit 1524 sets a region other than the closed region D1 and the closed region D2, as the threshold value range A. According to the configuration described with reference to FIG. 11, the user can easily set the threshold value range having a large range.

It may be arranged such that the user can select a first mode in which a closed region formed by the user is a threshold value range, and a second mode in which a region other than a closed region formed by the user is a threshold value range. For example, the display device 150 may be arranged to display a selection screen on the display surface 156. The selection screen is a screen on which the first mode and the second mode are displayed as options. The display device 150 sets the mode of an option that is selected (touched) by the user, when the selection screen is displayed. According to this configuration, the user can select the first mode and the second mode. Therefore, convenience for the user can be improved.

With reference to FIG. 11, there has been described an example of a case where two closed regions are formed. The idea described with reference to FIG. 11 may be also applied to the case where one closed region is formed as shown in FIG. 7 and the case where two lines are drawn (see FIG. 8 and FIG. 9). For example, when the idea described with reference to FIG. 11 is applied to the idea described with reference to FIG. 7, a region other than the threshold value range A is set as a threshold value range, out of all regions of the display surface 156. Further, when the idea described with reference to FIG. 11 is applied to the idea described with reference to FIG. 8, a region other than the threshold value range A is set as a threshold value range, out of all regions of the display surface 156. Further, when the idea described with reference to FIG. 11 is applied to the idea described with reference to FIG. 9, a region other than the threshold value range A is set as a threshold value range, out of all regions of the display surface 156.

Figure 12:
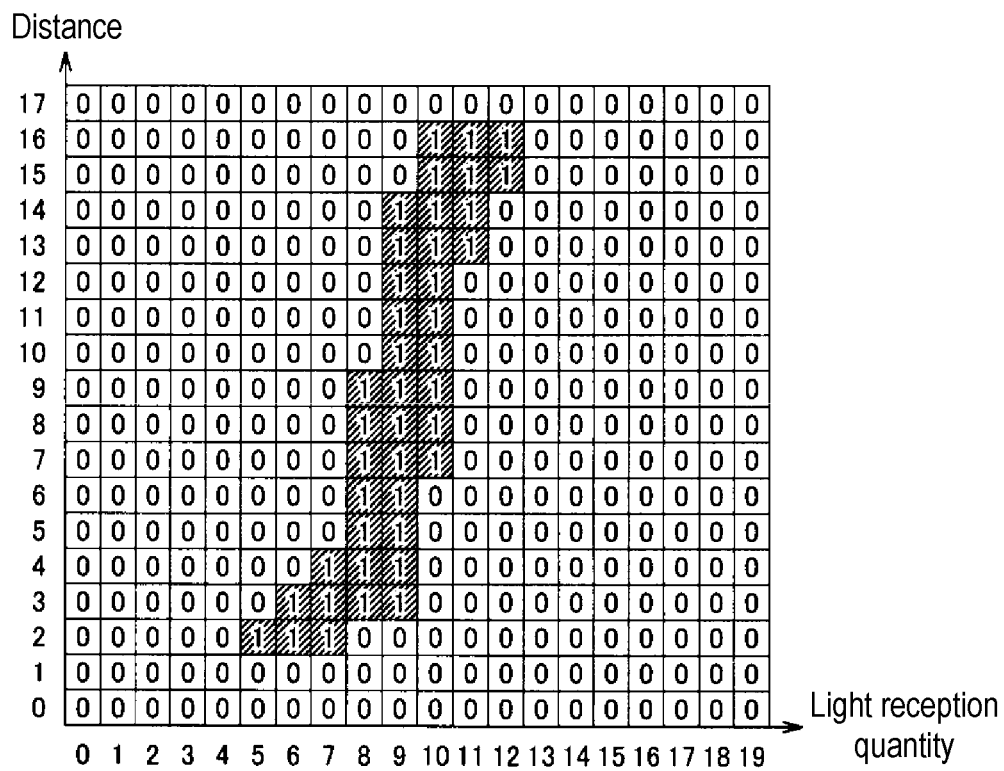
FIG. 12 is a diagram for explaining a case where a threshold value range is binarized according to an embodiment.
Figure 13:
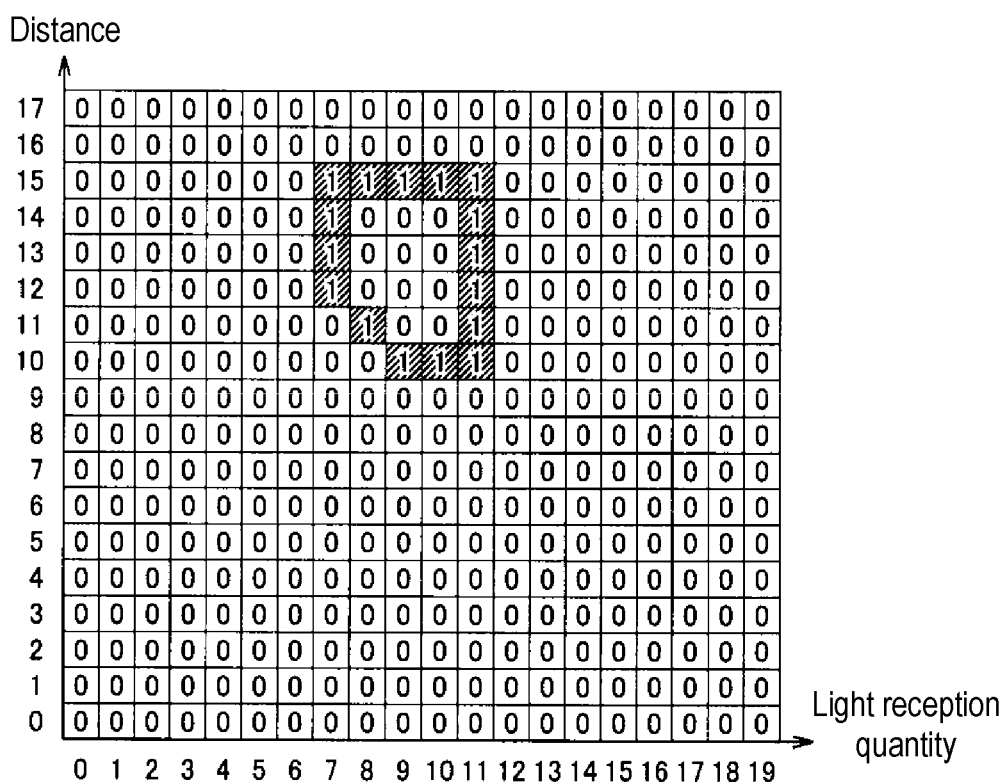
FIG. 13 is a diagram for explaining a case where a threshold value range is binarized according to an embodiment.
Figure 14:
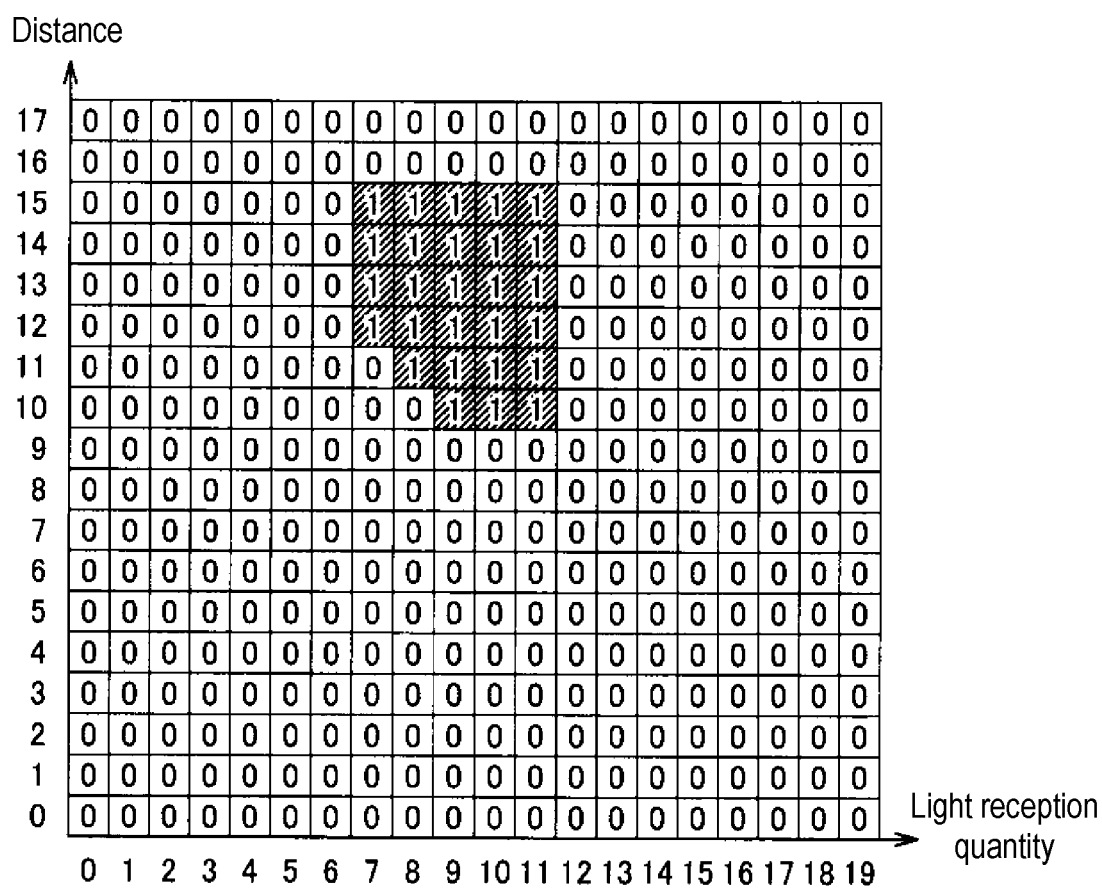
FIG. 14 is a diagram for explaining a case where a threshold value range is binarized according to an embodiment.

In a detection step described later, a detection object is detected by using a decision table based on a set threshold value range. The decision table shows each element (each coordinate), that is binarized, of the display surface 156. The binarization will be described next. FIG. 12 is a diagram that schematically shows the binarization of a closed region that is set by the user. In FIG. 12, and FIG. 13 and FIG. 14 described later, for simplification of the drawings, a range of the light reception quantity (the X axis) is set 0 to 19, and a range of the distance (the Y axis) is set 0 to 17. However the light reception quantity and the distance may be actually in other ranges, instead of these regions. A range of the light reception quantity is set 0 to 1000, and a range of the distance is set 100 to 300, for example.

In FIG. 12, "1" indicates a position touched by the user, and "0" indicates a position not touched by the user. FIG. 13 is a diagram that schematically shows a case where the user touches the display surface 156 so as to form a closed region. FIG. 14 is a diagram that schematically shows a case where the closed region in FIG. 13 is converted to "1". The threshold value range can be expressed in the mode shown in FIG. 12 and FIG. 14. FIG. 14 shows a case where the user selects the first mode (a mode in which the closed region formed by the user is a threshold value range). For example, when the user selects the second mode (a mode in which a region other than the closed region formed by the user is a threshold value range), a position of "0" becomes "1", and a position of "1" becomes "0", in FIG. 14.

Figure 15:
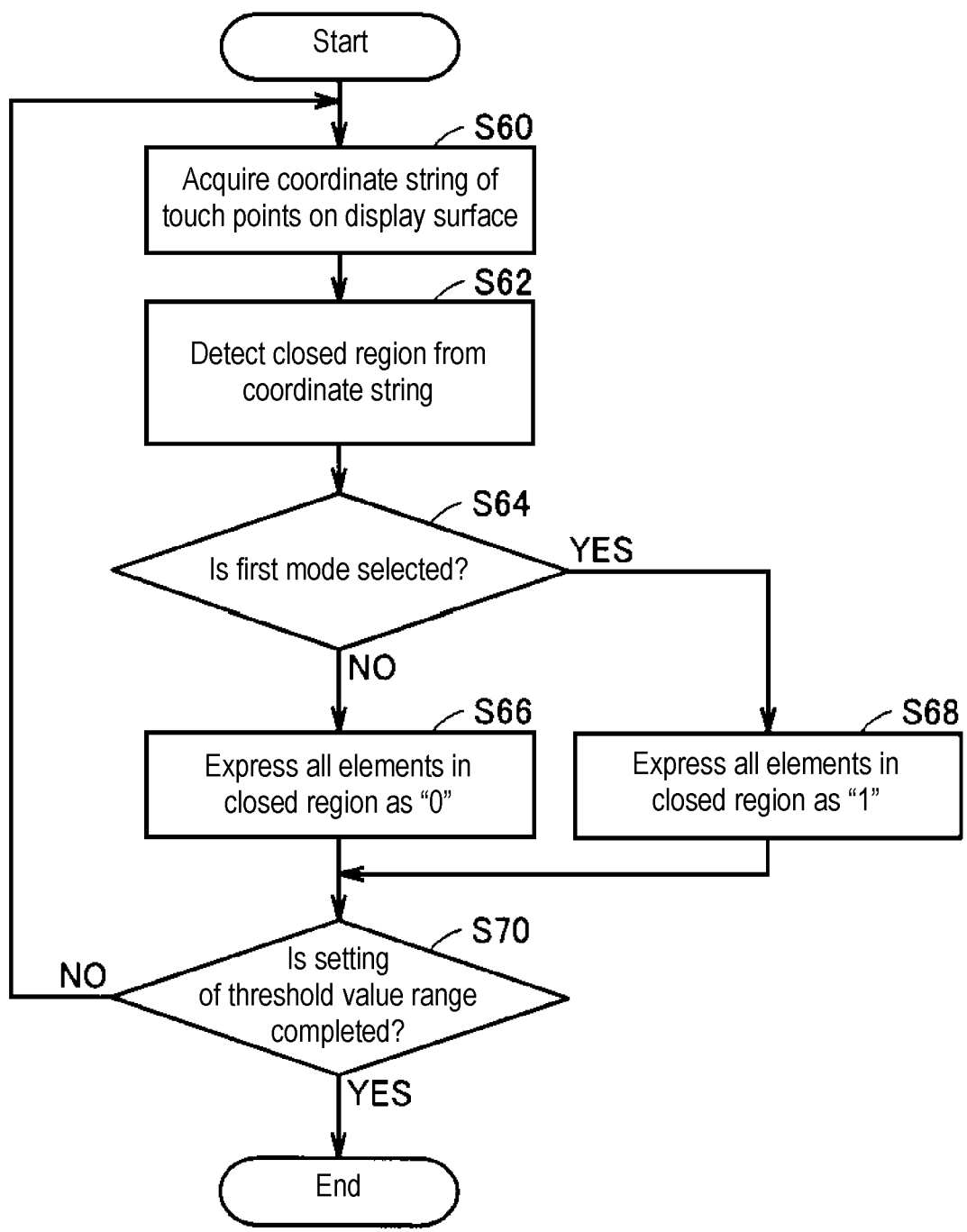
FIG. 15 is a diagram for explaining an example of a flowchart of a threshold value range setting step according to an embodiment.

FIG. 15 is a diagram showing a flowchart of the threshold value range setting step. In S60, the setting unit 1524 acquires a coordinate string of touch points by the user on the display surface 156. The coordinate string is an aggregate of coordinates of the positions touched by the user. In S62, the setting unit 1524 detects a closed region from the coordinate aggregate acquired in S60. Next, in S64, the setting unit 1524 decides whether the first mode is selected. When it is decided in S64 that the first mode is selected (YES in S64), the process proceeds to S68. When it is decided in S64 that the first mode is not selected, that is, the second mode is selected (NO in S64), the process proceeds to S66.

In S68, as shown in FIG. 14, all elements in the closed region are expressed as "1". Also, all elements in the region other than the closed region are expressed as "0". On the other hand, in S66, all elements in the closed region are expressed as "0". Also, all elements in a region other than the closed region are expressed as "1".

After ending S66, and after ending S68, the process proceeds to S70. In S70, the setting unit 1524 decides whether the setting of the threshold value range is completed. When the setting unit 1524 decides in S70 that the setting of the threshold value range is completed (YES in S70), the process in FIG. 15 ends. When the setting unit 1524 decides in S70 that the setting of the threshold value range is not completed (NO in S70), the process returns to S60. When the graph in FIG. 7 or in other drawing is being displayed on the display surface 156, a setting end button (not shown) is also displayed. The decision in S70 is made based on whether the setting end button has been touched. In the decision process in S70, when it is decided that the setting end button has been touched, YES is decided in S70. In the decision process in S70, when it is decided that the setting end button has not been touched, NO is decided in S70.

As described above, in the threshold value range setting step, the user can easily set a threshold value range by touching the display surface 156. As described above, the threshold value range as shown in FIG. 12 and FIG. 14 is a "decision table". The values "0" and "1" defined in the decision table are also referred to as "element values".

About Detection Step

Figure 16:
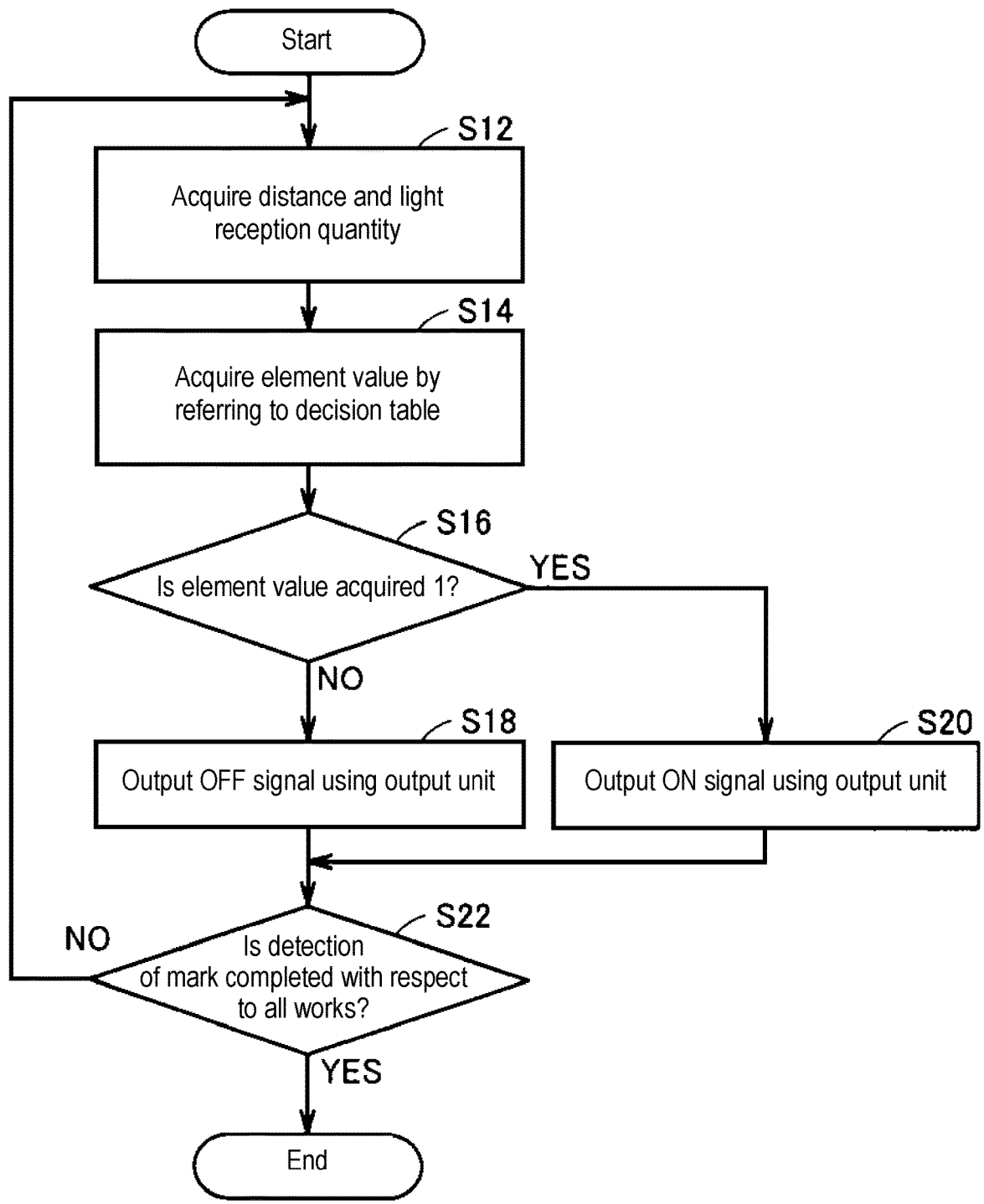
FIG. 16 is a diagram for explaining an example of a flowchart of a detection step according to an embodiment.

Next, the detection step will be described. The detection step is a step in which the detection system 1 detects the detection object (the mark 1002), based on the set threshold value range. FIG. 16 shows an example of a flowchart of the detection step. First, in S12, the detector 1526 acquires a light reception quantity (data) from the light reception quantity acquiring unit 204, and acquires a distance (data) from the distance acquiring unit 206. The light reception quantity and the distance are simultaneously acquired by the detection device 200.

Next, in S14, the detector 1526 acquires element values corresponding to the distance and the light reception quantity acquired in S12, by referring to the decision table (see FIG. 12 and FIG. 14). For example, in the decision table shown in FIG. 14, when the light reception quantity acquired in S12 is 10 and the distance is 15, the detector 1526 acquires "1" as the element value. When the light reception quantity acquired in S12 is 7 and the distance is 9, the detector 1526 acquires "0" as the element value. After the process in S14 ends, the process proceeds to S16.

In S16, the detector 1526 decides whether the element value acquired in S14 is 1. When it is decided in S16 that the element value is 1, the process proceeds to S20, and when it is decided in S16 that the element value is 0, the process proceeds to S18.

In S20, based on the control by the detector 1526, the output unit 154 outputs an ON signal. The ON signal is a signal that indicates that the detector 1526 is detecting the mark 1002 as a detection object. Further, in S18, the output unit 154 outputs an OFF signal, based on the control by the detector 1526. The OFF signal is a signal that indicates that the detector 1526 is not detecting the mark 1002 as a detection object.

When the process in S18 and the process in S20 end, the process proceeds to S22. In S22, it is decided whether the detector 1526 has ended the detection of each mark 1002 of all the works 1000. For example, the user decides whether the detection of each mark 1002 of all the works 1000 has ended. When the user decides that the detection of each mark 1002 of all the works 1000 has ended, the user performs a detection end operation. The decision in S22 is made by the user, based on whether the detection end operation has been performed. The detection end operation is the operation performed to a detection end button (not shown). When it is decided in the decision process in S22 that the detection end button has been operated, YES is decided in S22. When it is decided in the decision process in S22 that the detection end button has not been operated, NO is decided in S22.

When YES is decided in S22, the detection step ends. When NO is decided in S22, the process returns to S12. A series of the processes S12 to S22 is performed in each predetermined detection cycle. The predetermined detection cycle may be the same as the sampling cycle described with reference to FIG. 5, or may be other cycle.

That is, in S14 and S16 in FIG. 16, the detector 1526 detects a detection object, based on whether the light reception quantity acquired by the light reception quantity acquiring unit 204 belongs to the threshold value range A and also whether the distance acquired by the distance acquiring unit 206 belongs to the threshold value range A. In brief, the detector 1526 detects a detection object, based on whether the light reception quantity acquired by the light reception quantity acquiring unit 204 and the distance acquired by the distance acquiring unit 206 belong to the threshold value range A.

More specifically, when it is decided that the light reception quantity acquired by the light reception quantity acquiring unit 204 belongs to the threshold value range A and also when it is decided that the distance acquired by the distance acquiring unit 206 belongs to the threshold value range A, it is decided that the detection device 200 is detecting a detection object. In brief, when it is decided that the light reception quantity acquired by the light reception quantity acquiring unit 204 and the distance acquired by the distance acquiring unit 206 belong to the threshold value range A, it is decided that the detection device 200 is detecting a detection object.

Effects of Detection System 1 According to Embodiment (1) Next, effects of the detection system 1 according to an embodiment will be described. A detection device (hereinafter, referred to as a detection device for a first comparison) that detects a detection object (the mark 1002) by using only a light reception quantity without using a distance in the situation described with reference to FIG. 1 will be described. The detection device for the first comparison outputs light, receives reflection light, and detects the mark 1002 based on the light reception quantity, for example. The light reception quantity is based on the color of the position at which the output light is reflected. Further, when the similarity between the color of the reflected position and the color of the mark 1002 becomes higher, the value as a light reception quantity becomes large. When the color of the reflected position is the same as the color of the mark 1002, the value as a light reception quantity is set to become a maximum value.

That is, the detection device for the first comparison acquires, as a large value, the light reception quantity of the reflection light from the position of the mark 1002 out of the work 1000. On the other hand, the detection device for the first comparison acquires, as a small value, the light reception quantity of the reflection light from a position other than the position of the mark 1002 out of the work 1000.

That is, when the detection device for the first comparison is in the state of acquiring a large value as a light reception quantity of reflection light, the detection device for the first comparison is detecting the mark 1002. When the detection device for the first comparison is in the state of acquiring a small value as a light reception quantity of reflection light, the detection device for the first comparison is detecting a position other than the mark 1002 out of the work 1000. When the detection device for the first comparison is in the state of detecting the mark 1002, the detection device for the first comparison externally outputs an ON signal indicating that the detection device is detecting the mark 1002. When the detection device for the first comparison is in the state of not detecting the mark 1002, the detection device for the first comparison externally outputs an OFF signal indicating that the detection device is not detecting the mark 1002.

A case where the detection device for the first comparison does not face a detection object will be described. In this case, the light output from the detection device for the first comparison is not reflected by a detection object, but is reflected by the wall 1006. The wall 1006 has the same color as the color of the mark 1002. Therefore, the detection device for the first comparison is acquiring a large value as reflection light from the wall 1006. Accordingly, although not detecting the mark 1002, the detection device for the first comparison externally outputs an ON signal, with a result that the detection device for the first comparison is making erroneous detection. As described above, the detection device for the first comparison performs erroneous detection, when in the situation described with reference to FIG. 16.

On the other hand, the detection system 1 according to an embodiment can properly detect a detection object, because the detection system 1 according to an embodiment detects the detection object (the mark 1002) by using not only the light reception quantity but also the distance.

A detection device (hereinafter, referred to as a detection device for a second comparison) that detects a detection object (the mark 1002) by using only a distance without using a light reception quantity will be described. For example, in the situation described with reference to FIG. 1, the detection device for the second comparison acquires the same distance, both when a reflection position is the mark 1002 of the work 1000 and when a reflection position is a position other than the mark 1002 of the work 1000. Therefore, the detection device for the second comparison cannot properly detect a detection object.

On the other hand, the detection system 1 according to an embodiment can properly detect a detection object, because the detection system 1 according to an embodiment detects the detection object (the mark 1002) by using not only the distance but also the light reception quantity.

Figure 17:
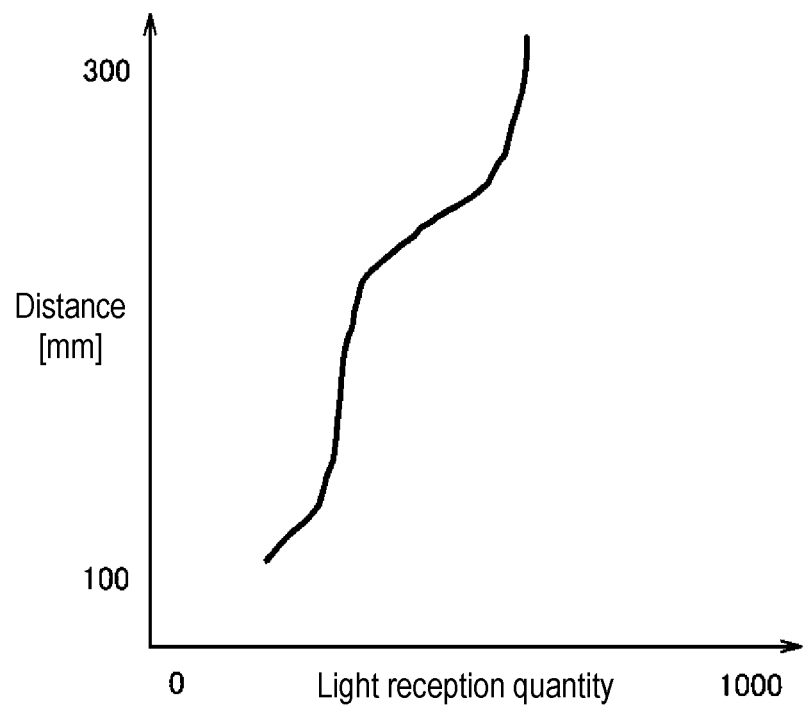
FIG. 17 is a diagram for explaining an effect of the detection system according to an embodiment.
Figure 18:
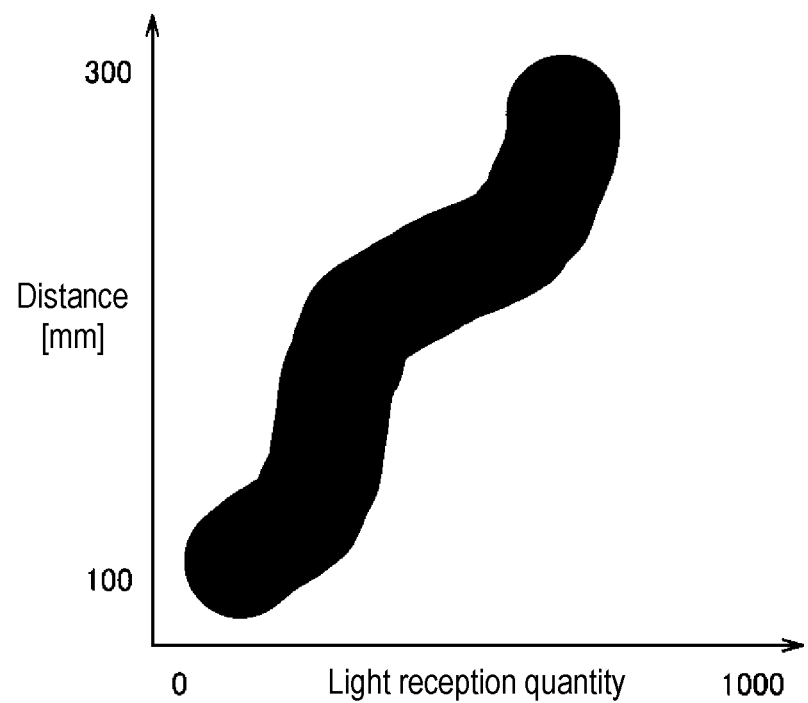
FIG. 18 is a diagram for explaining an effect of the detection system according to an embodiment.

(2) Next, effects of displaying two-dimensional information (the graph B shown in FIG. 4 and other drawings) will be described. By displaying the two-dimensional information, the user can be made to recognize stability of a detection state of the detection system 1. FIG. 17 and FIG. 18 are diagrams for describing the stability of the detection state. In this case, there will be described a case where, in the two-dimensional information display step, a distance and a light reception quantity are acquired for each of a plurality of works that are all the same.

FIG. 17 shows a case where two-dimensional information is displayed when a detection state of the detection system 1 is stable. Since a plurality of works are all the same, when the detection state of the detection system 1 is stable, a variance of detection values is small, and a line width of the graph B is displayed small. That is, the user can be made to recognize that the detection state is stable when the graphs of the plurality of works that are superposed are displayed as shown in FIG. 17.

FIG. 18 shows a case where two-dimensional information is displayed when a detection state of the detection system 1 is unstable. When a detection state of the detection system 1 is unstable although a plurality of works are all the same, a variance of detection values becomes large, and a line width of the graph B is displayed large. That is, the user can be made to recognize that the detection state is unstable when the graphs of the plurality of works are displayed as shown in FIG. 18.

Figure 19:
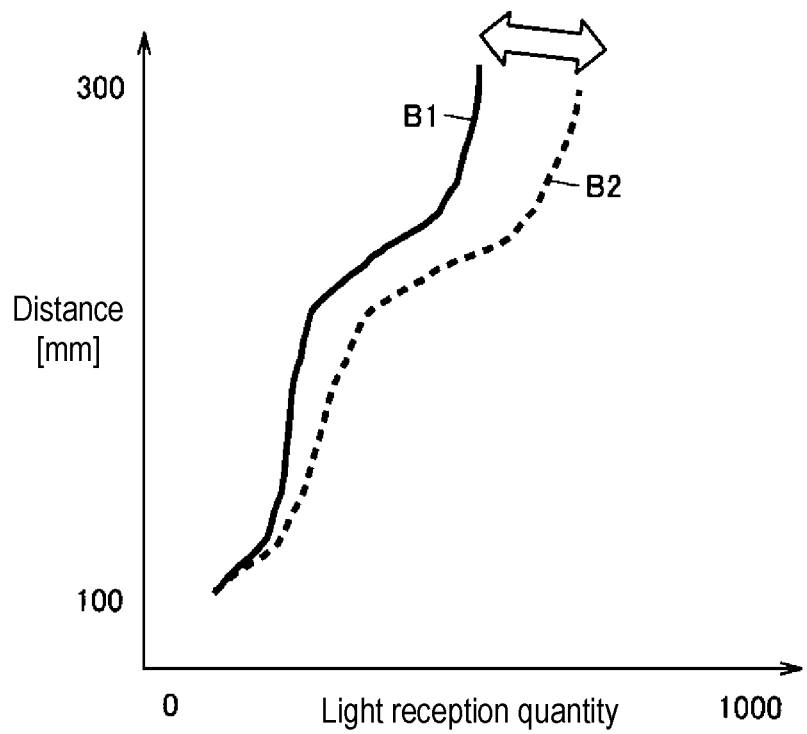
FIG. 19 is a diagram for explaining an effect of the detection system according to an embodiment.
Figure 20:
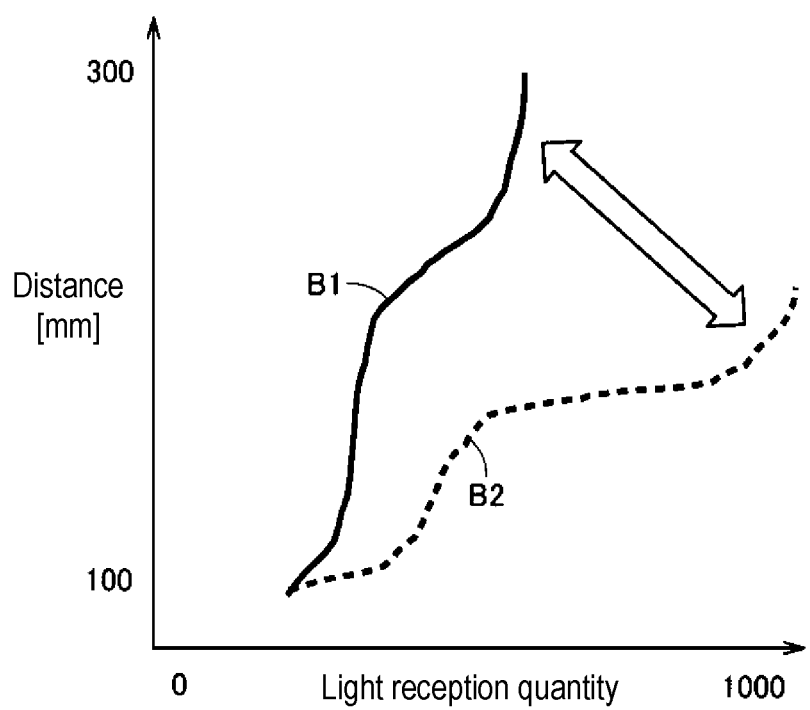
FIG. 20 is a diagram for explaining an effect of the detection system according to an embodiment.

(3) Next, other effects of displaying two-dimensional information (the graph B shown in FIG. 4 and other drawings) will be described. By displaying the two-dimensional information, the user can be made to recognize a decision margin. The decision margin is a margin of decision about whether a work for which a distance and a light reception quantity are acquired (hereinafter, referred to as a work for detection) is a passed work (a work that satisfies a standard) or a failed work (a work that does not satisfy the standard). When the decision margin is high, the user can easily decide whether the work for detection is a passed work or a failed work. In FIG. 19 and FIG. 20, a graph of the passed work is shown by a solid line (a graph B1), and a graph of the failed work is shown by a broken line (a graph B2). When the graph of the passed work and the graph of the failed work are greatly different, the user can easily recognize whether the work for detection is a passed work or a failed work. When the graph of the passed work and the graph of the failed work are greatly different, the decision margin is high.

FIG. 20 is larger than FIG. 19 in separation between the graph of the passed work and the graph of the failed work (the large degree of difference between the graph of the passed work and the graph of the failed work). Accordingly, FIG. 20 is larger than FIG. 19 in the decision margin. The two-dimensional information (graph) of each of the passed work and the failed work is displayed, which allows the user to recognize the decision margin.

Modifications

Although the embodiments of is described above with reference to the drawings, the present invention is not limited to the embodiments. Various changes and modifications can be made without departing from the scope of the present invention. Modifications will be described below.

Figure 21:
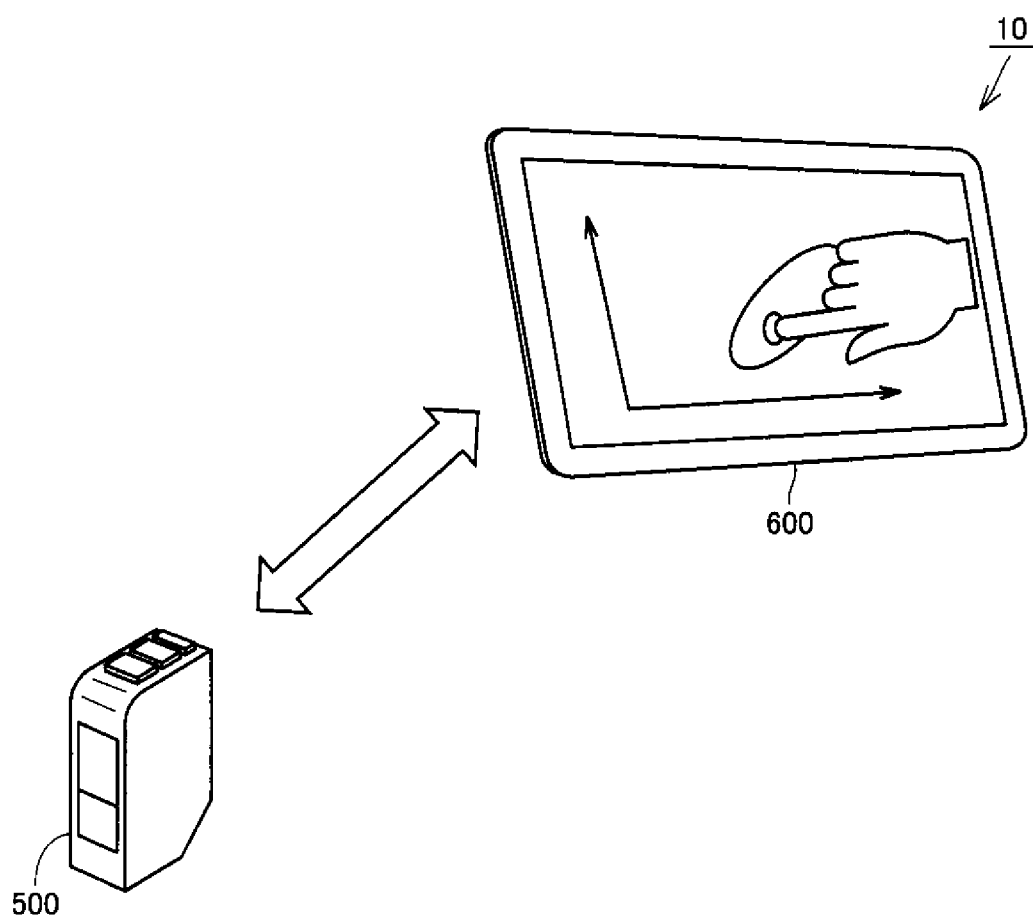
FIG. 21 is a diagram for explaining a configuration example of a detection system according to a modification.

(1) FIG. 21 is a diagram for explaining a functional configuration example of a detection system 10 according to a modification. As shown in FIG. 21, the detection system 10 includes a detection device 500 and a display device 600. The detection device 500 and the display device 600 can communicate with each other in a wired or wireless manner.

Any display device may be used as the display device 600 as long as the display device displays the two-dimensional information. The display device 600 may be an unportable personal computer (PC). The display device 600 may be a portable terminal that is portable by the user. For example, the portable terminal may be one of a smartphone and a tablet. For example, an application that can display the two-dimensional information is stored in the display device 600. Thus, in the detection system 10 of the modification, an existing display device can be used with no use of the display device dedicated to the detection system 1 unlike an embodiment, so that the configuration of the detection system can be facilitated.

Figure 22:
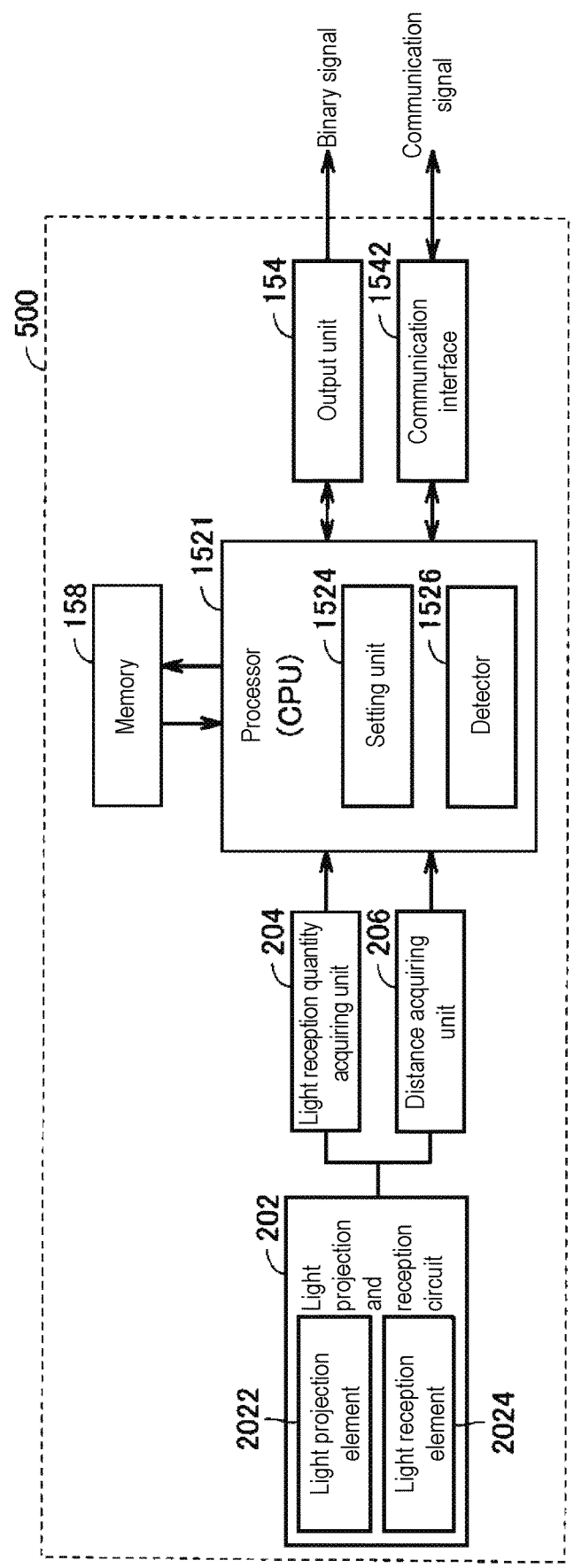
FIG. 22 is a diagram for explaining a functional configuration example of a detection device according to a modification.
Figure 23:
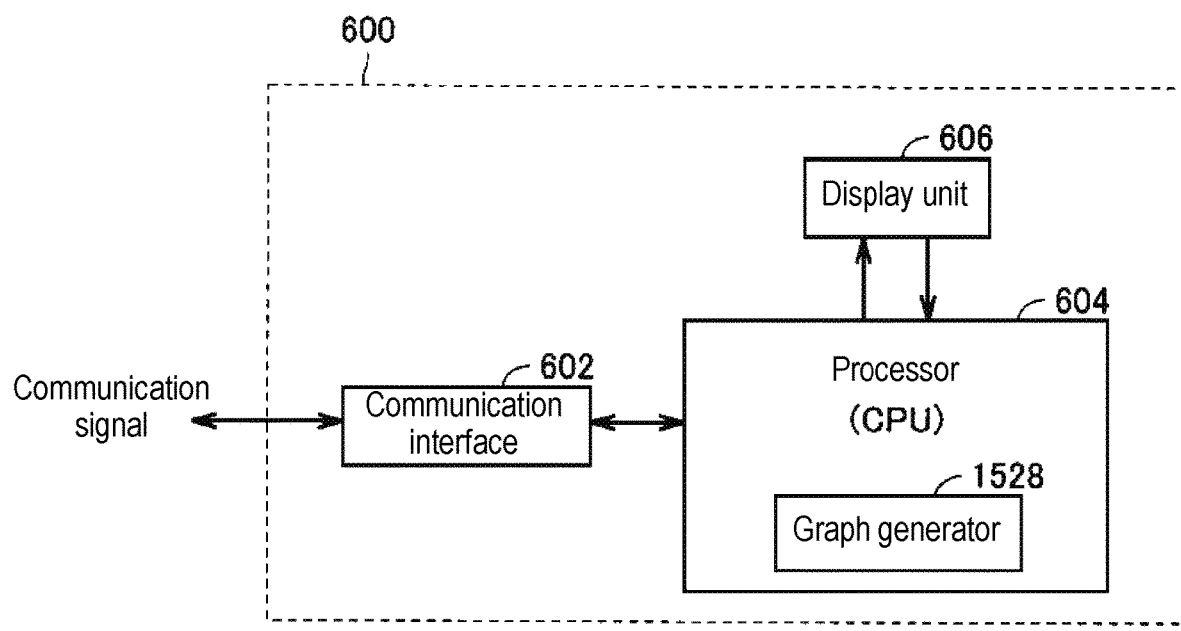
FIG. 23 is a diagram for explaining a functional configuration example of a display device according to a modification.

FIG. 22 illustrates a functional configuration example of the detection device 500, and FIG. 23 illustrates a functional configuration example of the display device 600. The detection system 1 of an embodiment differs from the detection system 10 of the modification in the following point. That is, in the detection system 1 of an embodiment, the display device 150 performs the threshold value range setting step and the detection step. On the other hand, in the detection system 10 of the modification, the detection device 500 performs the threshold value range setting step and the detection step. In the detection system 10 of the modification, the display device 600 performs the two-dimensional information display step.

The detection device 500 transmits the light reception quantity acquired by the light reception quantity acquiring unit 204 and the distance acquired by the distance acquiring unit 206 to the display device 600 through a communication interface 1542 as a communication signal. The display device 600 performs the two-dimensional information display step based on the transmitted light reception quantity and distance (displays the two-dimensional information).

The two-dimensional information is displayed on a display unit 606 of the display device 600, and the user touches the display surface of the display unit 606, whereby the user-touched coordinate is transmitted to the display device 600 through a communication interface 602 as the communication signal. The setting unit 1524 of the detection device 500 sets the threshold value range A based on the user-touched coordinate.

The detection system 10 of the modification has the effect similar to an embodiment. The detection device may perform at least one of the two-dimensional information display step, the threshold value range setting step, and the detection step, and another device may perform other steps.

(2) In an embodiment, by way of example, the user touches the display surface 156 as the user input. However, the user input form is not limited to the touch of the display surface 156, and other mode may be employed. For example, voice input of the user may be used as the other mode. For example, when the user utters "distances 120 to 180, light reception quantities 300 to 400", the detection system sets the threshold value range based on the voice. In this case, "distances 120 to 180, light reception quantities 300 to 400" indicated by the voice is set as the threshold value range.

Alternatively, as the other mode, the user may input a numerical value. For example, a keyboard including a hard key may be connected to the display device. The user may input the numerical value to the keyboard. A soft key may be displayed on the display surface of the display device. The user may input the numerical value using the soft key. Thus, the user can input the accurate numerical value by inputting the numerical value during the setting of the threshold value.

(3) In an embodiment, the graph B (see FIG. 7 and other drawings) is illustrated as the two-dimensional information about the distance and the light reception quantity. However, any information may be displayed as long as the information is the correspondence information in which the distance and the light reception quantity are related to each other. For example, a table in which the distance is indicated on the right while the light reception quantity acquired at the same time as the distance is indicated on the left may be displayed as the two-dimensional information. Even in the detection system having the configuration, the effect similar to an embodiment is obtained.

(4) The display device 150 may store the graph B and a date the graph B is produced while relating the graph B and the date to each other. In other words, the display device 150 may store the graph B to which a time stamp is added. This configuration can store a long-term detection state of the detection device 200. Accordingly, the user can check the detection state when an abnormality occurs in the detection device 200. Even when the user finds the abnormality, the user can understand the distance and the light reception quantity. Accordingly, the user can obtain the dispositions of the detection device 200 and the work 1000 such that the abnormality does not occur. The graph B may be stored in the display device 150 or an external storage device externally connected to the display device 150.

(5) In an embodiment, one detection device 200 is connected to one display device 150. However, a plurality of detection devices 200 may be connected to one display device 150. In this configuration, the detection system that detects the plurality of detection objects can be constructed at low cost.

(6) The process in the display device 150 in FIG. 3 and the process in the display device 600 in FIG. 23 are performed by hardware and software executed by the CPU. Sometimes the software is previously stored in a flash memory. Sometimes the software is distributed as a program product while stored in a memory card or another recording medium. Alternatively, sometimes the software is provided as a downloadable program product by an information provider connected to the Internet. In such cases, the software is read from the recording medium by an IC card reader/writer or another reader device, or downloaded through a communication interface, and temporarily stored in the flash memory. The software is read from the flash memory by the CPU, and stored in the flash memory in an executable program form. The CPU executes the program.

The display device 150 in FIG. 3 and the display device 600 in FIG. 23 are constructed with general components. Accordingly, it is said that an essential part is the software stored in the flash memory, the memory card, or other recording mediums, or the software that can be downloaded through the network.

The recording medium is not limited to a DVD-ROM, a CD-ROM, an FD (Flexible Disk), and a hard disk drive, but the recording medium may be a medium, such as a magnetic tape, a cassette tape, optical disks (such as a magnetic optical disc (MO), a mini disc (MD), and a digital versatile disc (DVD)), an optical card, and a semiconductor memories (such as a mask ROM, an electronically programmable read-only memory (EPROM), an electronically erasable programmable read-only memory (EEPROM), and a flash ROM), in which the program is fixedly retained. The recording medium is a non-transient medium in which a computer can read the program.

As used herein, the program includes a program having a source program form, a compressed program, and encrypted program in addition to the program that can be directly executed by the CPU.

(7) The disclosed embodiments are illustrative in all respects, and are not restrictive. The scope of the present invention is indicated by not the embodiments, but the claims, and the meanings equivalent to the claims and all the changes within the claims are included in the present invention.

The invention claimed is:

1. A detection system comprising:
a detection device; and
a control device that controls the detection device, wherein:
the detection device comprises:
   a light projecting unit configured to project light to a detection object;
   a light receiving unit configured to receive reflection light of the light;
   a light reception quantity acquiring unit configured to acquire a light reception quantity received by the light receiving unit; and
   a distance acquiring unit configured to acquire a distance between a position at which the light is reflected and the detection object; and
the control device comprises:
   a processor configured with a program to perform operations comprising:
      operation as a setting unit configured to set a threshold value range comprising a combination of a threshold value of the light reception quantity and a threshold value of the distance; and
      operation as a detector configured to detect the detection object based on whether the light reception quantity and the distance belong to the threshold value range; and
      operation as a display unit configured to display correspondence information in which the light reception quantity acquired by the light reception quantity acquiring unit and the distance acquired by the distance acquiring unit are related to each other.

2. The detection system according to claim 1, wherein the correspondence information comprises information in which the light reception quantity and the distance are shown two-dimensionally.

3. The detection system according to claim 2, wherein the detection system receives input information from a user when the correspondence information is displayed on the display unit, and
   the processor is configured with the program such that operation as the setting unit comprises operation as the setting unit that sets the threshold value range based on the input information with respect to the correspondence information displayed on the display unit.

4. The detection system according to claim 1, wherein the detection system receives input information from a user when the correspondence information is displayed on the display unit, and
   the processor is configured with the program such that operation as the setting unit comprises operation as the setting unit that sets the threshold value range based on the input information with respect to the correspondence information displayed on the display unit.

5. The detection system according to claim 4, wherein the display unit comprises an input unit on a display surface, the input unit configured to receive information about a user-touched position on the display surface as the input information when the user touches the display surface, and
   the processor is configured with the program such that operation as the setting unit comprises operation as the setting unit that sets the threshold value range based on the information about the user-touched position on the display surface of the display unit in which the correspondence information is displayed.

6. The detection system according to claim 5, wherein the processor is configured with the program such that operation as the setting unit comprises operation as the setting unit that sets the threshold value range in a range different from the user-touched position on the display surface in which the correspondence information is displayed.

7. The detection system according to claim 6, wherein, the processor is configured with the program such that operation as the setting unit comprises operation as the setting unit that, in response to the user touching the display surface so as to form a closed region on the display surface in which the correspondence information is displayed, sets the threshold value range based on the closed region.

8. The detection system according to claim 6, wherein the processor is configured with the program such that operation as the setting unit comprises operation as the setting unit that, in response to the user touching the display surface in two lines on the display surface in which the correspondence information is displayed, sets the threshold value range based on a range sandwiched between the two lines.

9. The detection system according to claim 5, wherein, the processor is configured with the program such that operation as the setting unit comprises operation as the setting unit that, in response to the user touching the display surface so as to form a closed region on the display surface in which the correspondence information is displayed, sets the threshold value range based on the closed region.

10. The detection system according to claim 9, wherein the processor is configured with the program such that operation as the setting unit comprises operation as the setting unit that, in response to the user touching the display surface in two lines on the display surface in which the correspondence information is displayed, sets the threshold value range based on a range sandwiched between the two lines.

11. The detection system according to claim 5, wherein the processor is configured with the program such that operation as the setting unit comprises operation as the setting unit that, in response to the user touching the display surface in two lines on the display surface in which the correspondence information is displayed, sets the threshold value range based on a range sandwiched between the two lines.

12. The detection system according to claim 11, wherein at least one of the two lines comprises a straight line.

13. The detection system according to claim 12, wherein at least one of the two lines comprises a curved line.

14. The detection system according to claim 11, wherein at least one of the two lines comprises a curved line.

15. The detection system according to claim 5, wherein the processor is configured with the program such that operation as the setting unit comprises operation as the setting unit that, in response to the user touching a plurality of regions on the display surface in which the correspondence information is displayed, sets a plurality of threshold value ranges based on the plurality of regions.

16. A detection device comprising:
    a light projecting unit configured to project light to a detection object;
    a light receiving unit configured to receive reflection light of the light;
    a light reception quantity acquiring unit configured to acquire a light reception quantity received by the light receiving unit;
    a distance acquiring unit configured to acquire a distance between a position at which the light is reflected and the detection object; and
    a processor configured with a program to perform operations comprising:
    operation as a setting unit configured to set a threshold value range comprising a combination of a threshold value of the light reception quantity and a threshold value of the distance; and
    operation as a detector configured to detect the detection object based on whether the light reception quantity and the distance belong to the threshold value range.

17. A detection method comprising:
    projecting light to a detection object;
    receiving reflection light of the light projected to the detection object;
    acquiring a light reception quantity of a light receiving unit that receives the reflection light;
    acquiring a distance between a position at which the light is reflected and the detection object;
    setting a threshold value range comprising a combination of a threshold value of the light reception quantity and a threshold value of the distance; and
    detecting the detection object based on whether the light reception quantity and the distance belong to the threshold value range.

18. The method according to claim 17, further comprising setting the threshold value range based on information input by a user with respect to correspondence information displayed on a display unit.

19. The method according to claim 17, further comprising setting the threshold value range based on information about a user-touched position on a display surface of a display unit.

20. The method according to claim 17, further comprising setting the threshold value range based on a closed region formed by a user touching a display surface of a display unit.

* * * * *